US008437535B2

(12) United States Patent
Boca et al.

(10) Patent No.: US 8,437,535 B2
(45) Date of Patent: May 7, 2013

(54) SYSTEM AND METHOD OF DETERMINING OBJECT POSE

(75) Inventors: Remus F. Boca, North Vancouver (CA); Simona Liliana Pescaru, Vancouver (CA); Jeffrey Scott Beis, North Vancouver (CA); Babak Habibi, North Vancouver (CA)

(73) Assignee: RoboticVISIONTech LLC, Great Falls, VA (US)

( * ) Notice: Subject to any disclaimer, the term of this patent is extended or adjusted under 35 U.S.C. 154(b) by 971 days.

(21) Appl. No.: 11/857,680

(22) Filed: Sep. 19, 2007

(65) Prior Publication Data
US 2008/0069435 A1   Mar. 20, 2008

Related U.S. Application Data

(60) Provisional application No. 60/845,932, filed on Sep. 19, 2006.

(51) Int. Cl.
*G06K 9/00*   (2006.01)

(52) U.S. Cl.
USPC .......................................................... 382/154

(58) Field of Classification Search ................... 382/154
See application file for complete search history.

(56) References Cited

U.S. PATENT DOCUMENTS

| 3,986,007 A | 10/1976 | Ruoff, Jr. .................... 235/151.1 |
| 4,011,437 A | 3/1977 | Hohn |
| 4,146,924 A | 3/1979 | Birk et al. ...................... 364/513 |
| 4,187,454 A | 2/1980 | Ito et al. |
| 4,219,847 A | 8/1980 | Pinkney et al. ............... 358/126 |
| 4,294,544 A | 10/1981 | Altschuler et al. ............ 356/376 |
| 4,305,130 A | 12/1981 | Kelley et al. .............. 364/513 |
| 4,334,241 A | 6/1982 | Kashioka et al. ............. 358/107 |
| 4,402,053 A | 8/1983 | Kelley et al. .................. 364/513 |

(Continued)

FOREIGN PATENT DOCUMENTS

| DE | 19515949 A1 | 11/1996 |
| DE | 102 36 040 A1 | 2/2004 |

(Continued)

OTHER PUBLICATIONS

U.S. Appl. No. 11/754,218, filed May 25, 2007, Habibi et al.

(Continued)

*Primary Examiner* — Alex Liew
(74) *Attorney, Agent, or Firm* — Seed IP Law Group PLLC

(57) ABSTRACT

Briefly described, one embodiment determines pose of an object of interest at a run time by capturing a first image of a first structured light pattern projected onto a first local surface of the object of interest; determining a first run-time data set from the captured first image, wherein the first run-time data set corresponds to information determined from the first structured light pattern projected onto the first local surface; comparing the determined first run-time data set and a corresponding first reference data set, the first reference data set corresponding to an ideal pose of the first local surface on an ideally posed reference object; and determining at least one first degree of constraint that defines a first partial pose of the first local surface, the at least one first degree of constraint based upon the comparison of the first run-time data set with the corresponding first reference data set.

27 Claims, 6 Drawing Sheets

U.S. PATENT DOCUMENTS

| | | | | |
|---|---|---|---|---|
| 4,437,114 A | 3/1984 | LaRussa | | 358/101 |
| 4,523,809 A | 6/1985 | Taboada et al. | | 350/163 |
| 4,578,561 A | 3/1986 | Corby, Jr. et al. | | 219/124.34 |
| 4,613,942 A | 9/1986 | Chen | | 364/513 |
| 4,654,949 A | 4/1987 | Pryor | | 29/407 |
| 4,687,325 A | 8/1987 | Corby, Jr. | | 356/1 |
| 4,791,482 A | 12/1988 | Barry et al. | | 358/107 |
| 4,835,450 A | 5/1989 | Suzuki | | 318/568.13 |
| 4,871,252 A | 10/1989 | Beni et al. | | |
| 4,879,664 A * | 11/1989 | Suyama et al. | | 700/186 |
| 4,904,996 A | 2/1990 | Fernandes | | |
| 4,942,539 A | 7/1990 | McGee et al. | | 364/513 |
| 4,985,846 A | 1/1991 | Fallon | | 364/513 |
| 5,014,183 A | 5/1991 | Carpenter et al. | | |
| 5,083,073 A | 1/1992 | Kato | | 318/577 |
| 5,160,977 A * | 11/1992 | Utsumi | | 356/606 |
| 5,208,763 A | 5/1993 | Hong et al. | | 364/551.02 |
| 5,212,738 A | 5/1993 | Chande et al. | | 382/8 |
| 5,300,869 A | 4/1994 | Skaar et al. | | |
| 5,325,468 A | 6/1994 | Terasaki et al. | | 395/97 |
| 5,350,269 A | 9/1994 | Azuma et al. | | 414/416 |
| 5,446,835 A | 8/1995 | Iida et al. | | 395/133 |
| 5,454,775 A | 10/1995 | Cullen et al. | | 483/16 |
| 5,461,478 A | 10/1995 | Sakakibara et al. | | 356/375 |
| 5,499,306 A | 3/1996 | Sasaki et al. | | 382/291 |
| 5,521,830 A | 5/1996 | Saito | | |
| 5,523,663 A | 6/1996 | Tsuge et al. | | |
| 5,568,593 A | 10/1996 | Demarest et al. | | 395/82 |
| 5,579,444 A | 11/1996 | Dalziel et al. | | |
| 5,608,818 A | 3/1997 | Chini et al. | | 382/153 |
| 5,621,807 A | 4/1997 | Eibert et al. | | |
| 5,633,676 A | 5/1997 | Harley et al. | | |
| 5,645,248 A | 7/1997 | Campbell | | |
| 5,696,673 A | 12/1997 | Pryor | | 364/167.01 |
| 5,715,166 A | 2/1998 | Besl et al. | | 364/474.24 |
| 5,745,523 A | 4/1998 | Dent et al. | | |
| 5,784,282 A | 7/1998 | Abitbol et al. | | 364/474.28 |
| 5,802,201 A | 9/1998 | Nayar et al. | | 382/153 |
| 5,809,006 A | 9/1998 | Davis et al. | | |
| 5,870,527 A | 2/1999 | Fujikawa et al. | | 395/80 |
| 5,956,417 A | 9/1999 | Pryor | | 382/154 |
| 5,959,425 A | 9/1999 | Bieman et al. | | 318/568.15 |
| 5,974,169 A | 10/1999 | Bachelder | | 382/151 |
| 5,978,521 A | 11/1999 | Wallack et al. | | 382/294 |
| 5,988,862 A | 11/1999 | Kacyra et al. | | |
| 6,004,016 A | 12/1999 | Spector | | 364/167.02 |
| 6,044,183 A | 3/2000 | Pryor | | 382/287 |
| 6,064,759 A | 5/2000 | Buckley et al. | | 382/154 |
| 6,079,862 A | 6/2000 | Kawashima et al. | | |
| 6,081,370 A | 6/2000 | Spink | | |
| 6,115,480 A | 9/2000 | Washizawa | | 382/103 |
| 6,141,863 A | 11/2000 | Hara et al. | | 29/714 |
| 6,167,607 B1 | 1/2001 | Pryor | | 29/407.04 |
| 6,173,066 B1 | 1/2001 | Peurach et al. | | |
| 6,211,506 B1 | 4/2001 | Pryor et al. | | 250/208.1 |
| 6,236,896 B1 | 5/2001 | Watanabe et al. | | 700/37 |
| 6,246,468 B1 | 6/2001 | Dimsdale | | |
| 6,278,906 B1 | 8/2001 | Piepmeier et al. | | |
| 6,301,763 B1 | 10/2001 | Pryor | | 29/407.04 |
| 6,328,523 B1 | 12/2001 | Watanabe et al. | | |
| 6,341,246 B1 | 1/2002 | Gerstenberger et al. | | 700/245 |
| 6,392,744 B1 | 5/2002 | Holec | | 356/4.03 |
| 6,424,885 B1 | 7/2002 | Niemeyer et al. | | |
| 6,463,358 B1 | 10/2002 | Watanabe et al. | | 700/253 |
| 6,466,843 B1 | 10/2002 | Bonanni et al. | | 700/245 |
| 6,490,369 B1 | 12/2002 | Beiman | | 382/153 |
| 6,516,092 B1 | 2/2003 | Bachelder et al. | | 382/181 |
| 6,529,627 B1 | 3/2003 | Callari et al. | | 382/154 |
| 6,546,127 B1 | 4/2003 | Seong et al. | | |
| 6,549,288 B1 | 4/2003 | Migdal et al. | | 356/603 |
| 6,560,513 B2 | 5/2003 | Krause et al. | | |
| 6,580,971 B2 | 6/2003 | Bunn et al. | | 700/259 |
| 6,594,600 B1 | 7/2003 | Arnoul et al. | | 702/94 |
| 6,628,819 B1 | 9/2003 | Huang et al. | | 382/154 |
| 6,668,082 B1 | 12/2003 | Davison et al. | | |
| 6,721,444 B1 | 4/2004 | Gu et al. | | 382/154 |
| 6,724,930 B1 | 4/2004 | Kosaka et al. | | 382/154 |
| 6,728,582 B1 | 4/2004 | Wallack | | |
| 6,741,363 B1 | 5/2004 | Kaupert | | 356/602 |
| 6,748,104 B1 | 6/2004 | Bachelder et al. | | 382/151 |
| 6,754,560 B2 | 6/2004 | Fujita et al. | | 700/245 |
| 6,804,416 B1 | 10/2004 | Bachelder et al. | | 382/294 |
| 6,816,755 B2 | 11/2004 | Habibi et al. | | 700/259 |
| 6,836,567 B1 | 12/2004 | Silver et al. | | |
| 6,836,702 B1 | 12/2004 | Brogårdh et al. | | 700/245 |
| 6,841,780 B2 * | 1/2005 | Cofer et al. | | 250/341.1 |
| 6,853,965 B2 | 2/2005 | Massie et al. | | |
| 6,898,484 B2 | 5/2005 | Lemelson et al. | | |
| 6,970,802 B2 | 11/2005 | Ban et al. | | 702/153 |
| 6,985,620 B2 | 1/2006 | Sawhney et al. | | |
| 7,003,616 B2 | 2/2006 | Shimura | | |
| 7,006,236 B2 | 2/2006 | Tomasi et al. | | 356/614 |
| 7,009,717 B2 | 3/2006 | Van Coppenolle et al. | | 356/603 |
| 7,024,280 B2 | 4/2006 | Parker et al. | | |
| 7,061,628 B2 | 6/2006 | Franke et al. | | 356/604 |
| 7,084,900 B1 | 8/2006 | Watanabe et al. | | 348/94 |
| 7,085,622 B2 | 8/2006 | Sadighi et al. | | |
| 7,087,049 B2 | 8/2006 | Nowlin et al. | | |
| 7,130,446 B2 | 10/2006 | Rui et al. | | |
| 7,151,848 B1 | 12/2006 | Watanabe et al. | | |
| 7,177,459 B1 * | 2/2007 | Watanabe et al. | | 382/151 |
| 7,181,083 B2 | 2/2007 | Dell'Eva | | |
| 7,233,841 B2 | 6/2007 | Sadighi et al. | | |
| 7,313,464 B1 | 12/2007 | Perreault et al. | | |
| 7,336,814 B2 | 2/2008 | Boca et al. | | |
| 7,424,341 B2 | 9/2008 | Watanabe et al. | | |
| 7,627,395 B2 | 12/2009 | Sadighi et al. | | |
| 7,657,065 B2 | 2/2010 | Kotake et al. | | |
| 7,693,325 B2 | 4/2010 | Pulla et al. | | |
| 7,720,573 B2 | 5/2010 | Yamada et al. | | |
| 7,742,635 B2 | 6/2010 | Rohaly et al. | | |
| 7,796,276 B2 | 9/2010 | Schipke et al. | | |
| 7,916,935 B2 | 3/2011 | Larsen et al. | | |
| 7,957,583 B2 | 6/2011 | Boca et al. | | |
| 8,095,237 B2 | 1/2012 | Habibi et al. | | |
| 2001/0034481 A1 | 10/2001 | Horn | | |
| 2001/0055069 A1 | 12/2001 | Hudson | | |
| 2002/0019198 A1 | 2/2002 | Kamono | | |
| 2002/0028418 A1 | 3/2002 | Farag et al. | | |
| 2002/0156541 A1 | 10/2002 | Yutkowitz | | |
| 2002/0159628 A1 | 10/2002 | Matusik et al. | | |
| 2003/0004694 A1 | 1/2003 | Aliaga et al. | | 703/2 |
| 2003/0007159 A1 | 1/2003 | Franke et al. | | |
| 2003/0182013 A1 | 9/2003 | Moreas et al. | | |
| 2003/0202691 A1 | 10/2003 | Beardsley | | |
| 2003/0234349 A1 | 12/2003 | Wootton et al. | | |
| 2004/0037689 A1 | 2/2004 | Watanabe et al. | | 414/730 |
| 2004/0041808 A1 | 3/2004 | Ban et al. | | 345/419 |
| 2004/0073336 A1 | 4/2004 | Huang et al. | | |
| 2004/0080758 A1 * | 4/2004 | Ban et al. | | 356/603 |
| 2004/0081352 A1 | 4/2004 | Ban et al. | | 382/154 |
| 2004/0114033 A1 | 6/2004 | Eian et al. | | 348/42 |
| 2004/0168148 A1 | 8/2004 | Goncalves et al. | | |
| 2004/0172164 A1 | 9/2004 | Habibi et al. | | 700/245 |
| 2004/0190775 A1 | 9/2004 | Miller | | |
| 2004/0193321 A1 | 9/2004 | Anfindsen et al. | | 700/257 |
| 2004/0233461 A1 | 11/2004 | Armstrong et al. | | |
| 2004/0243282 A1 | 12/2004 | Watanabe et al. | | |
| 2005/0002555 A1 | 1/2005 | Kumiya et al. | | 382/153 |
| 2005/0065653 A1 | 3/2005 | Ban et al. | | |
| 2005/0097021 A1 | 5/2005 | Behr et al. | | |
| 2005/0103930 A1 | 5/2005 | Silansky et al. | | |
| 2005/0126833 A1 | 6/2005 | Takenaka et al. | | |
| 2005/0233816 A1 | 10/2005 | Nishino et al. | | |
| 2005/0246053 A1 | 11/2005 | Endou et al. | | |
| 2005/0273202 A1 | 12/2005 | Bischoff | | |
| 2006/0025874 A1 | 2/2006 | Huffington et al. | | |
| 2006/0088203 A1 | 4/2006 | Boca et al. | | 382/153 |
| 2006/0119835 A1 | 6/2006 | Rastegar et al. | | |
| 2006/0210112 A1 | 9/2006 | Cohen et al. | | |
| 2007/0032246 A1 | 2/2007 | Feher | | |
| 2007/0073439 A1 | 3/2007 | Habibi et al. | | 700/213 |
| 2007/0075048 A1 | 4/2007 | Kunisaki et al. | | |
| 2007/0235583 A1 | 10/2007 | Palmer | | |
| 2007/0276539 A1 | 11/2007 | Habibi et al. | | |
| 2008/0144884 A1 | 6/2008 | Habibi | | |
| 2008/0181485 A1 | 7/2008 | Beis et al. | | |

| | | | |
|---|---|---|---|
| 2009/0254217 | A1 | 10/2009 | Pack et al. |
| 2010/0017033 | A1 | 1/2010 | Boca |
| 2010/0040255 | A1 | 2/2010 | Rhoads |
| 2010/0092032 | A1 | 4/2010 | Boca |

FOREIGN PATENT DOCUMENTS

| | | |
|---|---|---|
| EP | 0 114 505 A1 | 8/1984 |
| EP | 0 151 417 A1 | 8/1985 |
| EP | 0 493 612 A1 | 7/1992 |
| EP | 0 763 406 B1 | 3/1997 |
| EP | 0 911 603 B1 | 4/1999 |
| EP | 0 951 968 A2 | 10/1999 |
| EP | 1 043 126 A2 | 10/2000 |
| EP | 1 043 642 A2 | 10/2000 |
| EP | 1 043 689 A2 | 10/2000 |
| EP | 1172183 A2 | 1/2002 |
| EP | 1345099 A2 | 9/2003 |
| EP | 1 484 716 A1 | 12/2004 |
| JP | 63288683 A | 11/1988 |
| JP | 01-124072 A | 5/1989 |
| JP | 07311610 | 11/1995 |
| JP | 10049218 | 2/1998 |
| JP | 2000024973 A2 | 1/2000 |
| JP | 2002018754 | 1/2002 |
| WO | 0106210 A1 | 1/2001 |
| WO | 2005/074653 A2 | 8/2005 |

OTHER PUBLICATIONS

U.S. Appl. No. 11/779,812, filed Jul. 18, 2007, Habibi.
U.S. Appl. No. 11/833,187, filed Aug. 2, 2007, Boca et al.
U.S. Appl. No. 60/413,180, filed Sep. 23, 2002, Eian et al.
U.S. Appl. No. 60/587,488, filed Jul. 14, 2004, Boca et al.
U.S. Appl. No. 60/808,903, filed May 26, 2003, Habibi et al.
U.S. Appl. No. 60/845,932, filed Sep. 19, 2006, Boca et al.
U.S. Appl. No. 60/875,073, filed Dec. 16, 2006, Beis et al.
"3D Robot Guidance with a Single Camera," *ISRA Vision Systems AG*, pp. 83-105. (No date available.).
"3D Vision with One Camera," URL=http://neu.isravision.com/likecms/index.php?site=site.html&dir=isra&nav=162, download date Apr. 12, 2005.
Aloimonos, J., et al., "Active Vision," *IEEE*, pp. 35-54, 1987.
Bajcsy, R., "Active Perception," *Proc. IEEE* 76(8):996-1005, 1988.
Bakhtari, A., et al., "Active-Vision Based Multi-Sensor Surveillance—An Implementation," *IEEE Transactions on Systems, Man and Cybernetics, Part C: Applications and Reviews*, 36(5):668-680, Sep. 2006.
Bejczy, A. K., "Challenges of Human-Robot Communication in Telerobotics," *IEEE International Workshop on Robot and Human Communication*, pp. 1-8, 1996.
Borotschnig, H., et al., "Active Object Recognition in Parametric Eigenspace," *Proc. 9th British Machine Vision Conference*, pp. 629-638, 1998.
Borotschnig, H., et al., "Appearance-Based Active Object Recognition," *Image and Vision Computing* 18:715-727, 2000.
Bouthemy, P., "A Maximum Likelihood Framework for Determining Moving Edges," *IEEE Trans. Pattern Analysis and Machine Intelligence* 11(5):499-511, 1989.
Brown, M., et al., "3D Model Acquisition by Tracking 2D Wireframes," *Proc. 11th British Machine Vision Conference*, pp. 656-665, 2000.
Callari, F., et al., "Active Recognition: Using Uncertainty to Reduce Ambiguity," *Proc. 13th International Conference on Pattern Recognition*, pp. 925-929, 1996.
Chaumette, F., "Potential Problems of Stability and Convergence in Image-Based and Position-Based Visual Servoing," in D. Kriegman, G. Hager and S. Morse, editors, *The Confluence of Vision and Control*, vol. 237 of Lecture Notes in Control and Information Sciences, pp. 66-78, Springer-Verlag, 1998.
Chaumette, F., et al., "Structure from Controlled Motion," *IEEE Trans. Pattern Analysis and Machine Intelligence* 18(5):492-504, May 1996.
Chen, L., et al., "An investigation on the accuracy of three-dimensional space reconstruction using Direct Linear Transformation Technique," *J. Biomechanics* 27(4):493-500, 1994.
Constantinescu, D., et al., "Smooth and Time-Optimal Trajectory Planning for Industrial Manipulators along Specified Paths," *Journal of Robotic Systems* 17(5):233-249, 2000.
Corke, P.I., et al., "A New Partitioned Approach to Image-Based Visual Servo Control," *IEEE Trans. On Robotics and Automation* 17(4):507-515, Aug. 2001.
Deguchi, K., "Optimal Motion Control for Image-Based Visual Servoing by Decoupling Translation and Rotation," in *Proc. Int. Conf. Intelligent Robots and Systems*, pp. 705-711, Oct. 1998.
Denzler, J., et al., "Learning, Tracking and Recognition of 3D Objects," *Proceedings of the IEEE/RSJ/GI, International Conference on Intelligent Robots and Systems (IROS)* 1:89-96, 1994.
Drummond, T., et al., "Real-time Tracking of Complex Structures with On-line Camera Calibration," *Proceedings of British Machine Vision Conference*, pp. 574-583, 1999.
Eriksen, R.D., et al., "Classification and pose estimation of unconstrained 3D objects," *34th International Symposium on Robotics*, Jun. 2-5, 2003, 7 pages.
Hartley et al., *Multiple View Geometry in Computer Vision*, Cambridge University Press, Cambridge, 2000.
Huang, T.S., et al., "Uniqueness of 3D Pose Under Weak Perspective: A Geometrical Proof," *IEEE Transactions on Pattern Analysis and Machine Intelligence* 17(12):1220-1221, Dec. 1995.
Hutchinson, S.A., et al., "Planning Sensing Strategies in a Robot Work Cell with Multi-Sensor Capabilities," *IEEE Trans. Robotics and Automation* 5(6):765-783, 1989.
Ji, Q., et al., "An Integrated Linear Technique for Pose Estimation from Different Geometric Features," *International Journal of Pattern Recognition and Artificial Intelligence*, 13(5):705-733, Aug. 1999.
Jia, Y-B., et al., "Sensing Polygon Poses by Inscription," in *Proc. of 1994 IEEE International Conference on Robotics and Automation*, pp. 1642-1649, May 1994.
Kim, W.S., "Computer Vision Assisted Virtual Reality Calibration," URL=http://www.robotics.jpl.nasa.gov/publications/Won_Kim/ra98_vrc.pdf., pp. 1-14, 1999.
Kovačič, S., et al., "Planning Sequences of Views for 3-D Object Recognition and Pose Determination," *Pattern Recognition* 31(10):1407-1417, 1998.
Liu, Y., et al., "Determination of Camera Location from 2D to 3D Line and Point Correspondences," *IEEE Transactions on Pattern Analysis and Machine Intelligence* 12(1):82-88, 1988.
Lowe, D.G., "Robust Model-based Motion Tracking Through the Integration of Search and Estimation," *International Journal of Computer Vision* 8(2):113-122, 1992.
Lu, C-P., et al., "Fast and Globally Convergent Pose Estimation from Video Images," written Feb. 18, 1998, Published in *IEEE*, Jun. 2000, 26 pages.
Macfarlane, S., et al., "Jerk-Bounded Manipulator Trajectory Planning: Design for Real-Time Applications," *IEEE Trans. Robotics and Automation* 19(1):42-52, 2003.
Meyer, W., "One-Eyed Robots With 3D Vision," *ISRA Vision Systems AG*, Press News, Release No. 16, Jun. 15, 2004, pp. 1-7.
Miura, J., et al., "Task-Oriented Generation of Visual Sensing Strategies in Assembly Tasks," CMU School of Computer Science Tech Report CMU-CS-95-116, 42 pages, 1995.
Motai, Y., et al., "Concatenate Feature Extraction for Robust 3D Elliptic Object Localization," *Proc. Of the 19th ACM Symposium on Applied Computing*, pp. 21-28, 2004.
Murase, H., et al., "Visual Learning and Recognition of 3-D Objects from Appearance," *International Journal of Computer Vision* 14(1):5-24, 1995.
Naish, M.D., et al., "Coordinated dispatching of proximity sensors for the surveillance of manoeuvring targets," *Journal of Robotics and Computer Integrated Manufacturing* 19(3):283-299, 2003.
Sanchez, A.-J., et al., "Robot-arm Pick and Place Behavior Programming System Using Visual Perception," in *Proceedings of the 15th International Conference on Pattern Recognition* 4:507-510, Sep. 2000.
Sang, T., et al., "Vision Assisted Robotic Tele-training," *IEEE International Conference on Mechatronics and Automation*, pp. 1288-1293, Jul. 2005.

Sharma, R., "Visual Servoing with Independently Controlled Cameras using a Learned Invariant Representation," in *Proceedings of the 37th IEEE Conference on Decision & Control*, pp. 3263-3268, Dec. 1998.

Tarabanis, K.A., et al., "A Survey of Sensor Planning in Computer Vision," *IEEE Transactions on Robotics and Automation* 11(1):86-104, Feb. 1995.

Tarabanis, K.A., et al., "The MVP Sensor Planning System for Robotic Vision Tasks," *IEEE Transactions on Robotics and Automation* 11(1):72-85, Feb. 1995.

Tsai, R..Y., et al., "A New Technique for Fully Autonomous and Efficient 3D Robotics Hand/Eye Calibration," *IEEE Transactions on Robotics and Automation* 5(3):345-358, Jun. 1989.

Tsai, R.Y., "An Efficient and Accurate Camera Calibration Technique for 3D Machine Vision," *Proceedings of IEEE, Conference on Computer Vision and Pattern Recognition*, pp. 364-374, 1986.

Tsai, R.Y., "A Versatile Camera Calibration Technique for High-Accuracy 3D Machine Vision Metrology Using Off-the-Shelf TV Cameras and Lenses," *IEEE Journal of Robotics and Automation* RA-3(4):323-344, Aug. 1987.

Vincze, M., "Robust tracking of ellipses at frame rate," *The Journal of Pattern Recognition* 34(2):487-498, 2001.

Wei, G.-Q., et al., "Active Self-calibration of Robotic Eyes and Hand-Eye Relationships with Model Identification," *IEEE Transactions on Robotics and Automation* 14(1):158-166, Feb. 1998.

Wei, G-Q., et al., "Multisensory Visual Servoing by a Neural Network," *IEEE Transactions on Systems, Man and Cybernetics, Part B: CYBERNETICS*, 29(2):276-280, Apr. 1999.

Whaite, P., et al., "From Uncertainty to Visual Exploration," *IEEE Transactions on Pattern Analysis and Machine Intelligence* 13(10):1038-1049, 1991.

Zhang, Z., "A Flexible New Technique for Camera Calibration," Microsoft Research Technical Report MSR-TR-98-71, Dec. 2, 1998, http://research.microsoft.com/scripts/pubs/view.asp?TR_ID=MSR-TR-98-71.

Zhou, F., et al., "Complete calibration of a structured light stripe vision sensor through planar target of unknown orientations," *Image and Vision Computing* 23:59-67, 2005.

Anonymous, "Precise Length Measurement at VSM (Vereinigte Schmirgel-Und Maschinen-Fabriken AG)," News of the Astech GMBH 2001(4), Dec. 31, 2001.

Beis, et al. "Indexing Without Invariants in 3D Object Recognition," IEEE Trans. On Pattern Analysis and Machine Intelligence, 21(10):1000-1015, 1999.

Brandner, "Uncertainty Estimation in a Vision-Based Tracking System," Proc. Int'l Workshop on Advanced Methods for Uncertainty Estimation in Measurement, pp. 40-45, Apr. 2006.

Chandrashaker et al., "Robotics and Structural Dynamics Characterization of the Space Station Remote Manipulator System Using Photogrammetric Techniques," IEEE, pp. 691-694, 1994.

Crowley et al., "Maintaining Stereo Calibration by Tracking Image Points," IEEE, pp. 483-488, 1993.

Feddema et al., "Vision-Guided Servoing with Feature-Based Trajectory Generation," IEEE Trans. On Robotics and Automation 5(5):691-700, Oct. 1989.

Holliday et al., "Demonstration of Automated Robotic Workcell for Hazardous Waste Characterization," Proceedings of the International Conference on Robotics and Automation 3(10):788-794, May 2, 1993.

Hutchison et al., "A Tutorial on Visual Servo Control," IEEE Transactions on Robotics and Automation 12(5), Oct. 1996.

Jensfelt et al., "Active Global Localization for a Mobile Robot Using Multiple Hypothesis Tracking," IEEE Trans. On Robotics and Automation 17(5):748-460, Oct. 2001.

Marjanovic et al., "Self-Taught Visually-Guided Pointing for a Humanoid Robot," XP-002220054, pp. 35-44, 1996.

Nelson et al., "Robotic Visual Servoing and Robotic Assembly Tasks," IEEE Robotics & Automation Magazine 3(2):23-31, Jun. 1996.

Nomura et al., "Integrated Visual Servoing System to Grasp Industrial Parts Moving on Conveyer by Controlling 6D0F Arm," Systems, Man, and Cybernetics, 2000 IEEE International Conference 3:1768-1775, Oct. 2000.

Papanikolopoulos et al., "Six Degree-of-Freedom Hand/Eye Visual Tracking with Uncertain Parameters," IEEE Transactions on Robotics and Automation 11(5):725-732, Oct. 1995.

Safaee-Rad et al., "Three-Dimensional Location Estimation of Circular Features for Machine Vision," IEEE, pp. 624-640, 1992.

Safaee-Rad et al., "An Analytical Method for the Location Estimation of Circular Features for an Active-Vision System," IEEE, pp. 215-220, 1990.

Sun et al., "Image Registration Using a 3-D Scene Representation," IEEE, pp. 828-832, 1998.

Triboulet et al., "Finding 3D Polyhedral Object Attitude Using a Virtual Model for Industrial Machining," IEEE, pp. 57-65, 2001.

Wilson et al., "Relative End-Effector Control Using Cartesian Position Based Visual Servoing," IEEE Transactions 12(5):684-696, 1996.

Xu et al., "Determining Camera Intrinsic and Extrinsic Parameters from Multiple Images of Multiple Balls," Science 87(2):2-6, 2004.

Yamazaki et al., "Object Shape Recognition and Pose Estimation by a Camera Mounted on a Mobile Robot," Proc. 2004 IEEE/RSJ Int'l Conf. on Intelligent Robots and Systems, pp. 4019-4025, Oct. 2004.

Yoon et al., "Real-Time Tracking and Pose Estimation for Industrial Objects using Geometric Features," Proc. 2003 IEEE Int'l Conf. on Robotics and Automation, pp. 3473-3478, Sep. 2003.

Office Action mailed in U.S. Appl. No. 11/957,258, Mail Date Jun. 21, 2012, 28 pages.

Office Action mailed in U.S. Appl. No. 11/779,812, Mail Date Dec. 16, 2011, 14 pages.

Office Action mailed in U.S. Appl. No. 12/249,658, Mail Date Feb. 6, 2012, 32 pages.

Amendment filed in U.S. Appl. No. 12/249,658, Mail Date Aug. 6, 2012, 21 pages.

Final Office Action mailed in U.S. Appl. No. 12/249,658,Mail Date Oct. 31, 2012, 40 pages.

Office Action mailed in U.S. Appl. No. 12/176,190, Mail Date Mar. 1, 2011, 15 pages.

Amendment filed in U.S. Appl. No. 12/176,190, Mail Date Sep. 1, 2011, 15 pages.

Office Action mailed in U.S. Appl. No. 12/176,190, Mail Date Nov. 15, 2011, 17 pages.

Amendment filed in U.S. Appl. No. 12/176,190, Mail Date May 15, 2012, 17 pages.

Office Action mailed in U.S. Appl. No. 12/176,190, Mail Date Oct. 31, 2012, 18 pages.

\* cited by examiner

SYSTEM AND METHOD OF DETERMINING OBJECT POSE

CROSS-REFERENCE TO RELATED APPLICATION

This application claims the benefit under 35 U.S.C. §119(e) of U.S. Provisional Patent Application No. 60/845,932 filed Sep. 19, 2006, where this provisional application is incorporated herein by reference in its entirety.

BACKGROUND

1. Field of the Invention

This disclosure generally relates to robotic systems and, more particularly, to robotic vision based systems operable to determine object pose (location and orientation) in three dimensional space.

2. Description of the Related Art

It is often necessary or desirable to determine object pose (i.e., position and orientation) for objects in controlling robotic systems. However, some objects do not possess clear, visible and/or readily identifiable geometric features, such as sharp, high contrast edges, contours, holes, etc. For example, car body panels such as roofs and hood panels are typically flat and lack sharp or high contrast features.

While computer aided design (CAD) models of the objects may exist, these models are typically difficult to obtain from original equipment manufacturers (OEMs) due to confidentiality concerns. Thus, end users must independently develop their own models of the objects for use with their robotic systems.

Independently developing models is time consuming and expensive. A priori measurements of the geometry of these objects are typically lengthy operations and require specialized equipment, such as coordinate measurement machines, or complex and expensive secondary scanning devices that require a high level of expertise to operate.

A separate challenge is related to the problem of determining the pose of such objects. Given the sparseness or lack of well-constrained visual features such as holes, corners, and fillets on many objects of interest, as well as the typically large size of such objects, the information from one region of the object is often insufficient to determine the overall pose of the object, at least to a sufficient degree of accuracy/repeatability for the required number of degrees of freedom or constraint. In such situations, it may be highly beneficial to have the ability to seamlessly incorporate surface information from one or more additional regions of the object captured by the same or different sensors from one or more stations. Existing methods may provide some insight into addressing the above-described problems of identifying object pose, for example those described in U.S. Pat. Nos. 5,715,166, 6,549,288, 6,392,744, and 5,461,478, all of which are incorporated herein by reference in their entirety.

However, the above U.S. patents are deficient in at least two major areas. First, a priori modeling information is required for the surface geometry of the target objects which, as explained above, may be difficult and/or expensive to obtain. That is, object pose is not determinable in the absence of an object model or other prior known information. Secondly, there are no practical methods for using a relatively small surface region of the object to determine overall object pose, unless that small surface region has unique features and/or characteristics which allow precise determination of pose. For example, determining the pose of an automobile hood based upon a small region is not practical because the hood is typically a relatively flat and smooth surface with no readily discernible unique features and/or characteristics (in at least a small localized area of the hood).

Accordingly, although there have been advances in the field, there remains a need in the art for increasing efficiency in determining object pose, particularly for objects that do not have readily discernible unique features and/or characteristics in at least a small localized area of the object. The present disclosure addresses these needs and provides further related advantages.

BRIEF SUMMARY

A system and method for determining a pose of an object of interest at a run time are disclosed. Briefly described, in one aspect, an embodiment of a method may be summarized as capturing a first image of a first structured light pattern projected onto a first local surface of the object of interest; determining a first run-time data set from the captured first image, wherein the first run-time data set corresponds to information determined from the first structured light pattern projected onto the first local surface; comparing the determined first run-time data set and a corresponding first reference data set, the first reference data set corresponding to an ideal pose of the first local surface on an ideally posed reference object; and determining at least one first degree of constraint that defines a first partial pose of the first local surface, the at least one first degree of constraint based upon the comparison of the first run-time data set with the corresponding first reference data set.

In another aspect, an alternative embodiment may be summarized as a system that determines a pose of an object of interest at a run time, comprising an image capture system operable to capture a first image of a first structured light pattern projected onto a first local surface of the object of interest and operable to capture a second image of a second structured light pattern projected onto a second local surface of the object of interest, a structured light source system operable to project the first structured light pattern onto the first local surface and operable to project the second structured light pattern onto the second local surface, and a processor communicatively coupled to the image capture system and the structured light source system. The processor is operable to determine a first run-time data set from the captured first image, wherein the first run-time data set corresponds to information determined from the first structured light pattern projected onto the first local surface; determine a second run-time data set from the captured second image, wherein the second run-time data set corresponds to information determined from the second structured light pattern projected onto the second local surface; compare the determined first run-time data set and a corresponding first reference data set, the first reference data set corresponding to an ideal pose of the first local surface on an ideally posed reference object, to determine at least a first degree of constraint corresponding to the pose of the first local surface; and compare the determined second run-time data set and a corresponding second reference data set, the second reference data set corresponding to the ideal pose of the second local surface on the ideally posed reference object, to determine at least a second degree of constraint corresponding to the pose of the second local surface.

In another aspect, another alternative embodiment of a method for determining a pose of an object of interest may be summarized as capturing at least one reference image of each of a plurality of reference local surfaces on a reference object oriented in a reference pose, wherein each of the plurality of reference local surfaces of the reference object has a structured light pattern projected thereon; and determining a plurality of reference data sets, wherein one reference data set is determined for each one of the plurality of reference local surfaces, and wherein the plurality of reference data sets corresponds to information determined from the structured light pattern projected onto its respective reference local surface.

In another aspect, another alternative embodiment may be summarized as a system that determines a pose of an object of interest at a run time, comprising a means for capturing at least one image of each of a plurality of local surfaces on the object of interest in an unknown pose at the run time, wherein each of the local surfaces of the object of interest in the unknown pose has a structured light pattern projected thereon, and wherein each one of the local surfaces of the object of interest in the unknown pose corresponds to one of a plurality of reference local surfaces; a means for determining a plurality of run-time data sets, wherein one run-time data set is determined for each one of the plurality of local surfaces, and wherein the plurality of run-time data sets corresponds to information determined from the structured light pattern projected onto its respective local surface; and a means for comparing the determined run-time data sets and a plurality of corresponding reference data sets.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments. However, one skilled in the art will understand that the embodiments may be practiced without these details. In other instances, well known structures associated with robotic systems have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open sense, that is as "including, but not limited to."

The headings provided herein are for convenience only and do not interpret the scope or meaning of the claimed embodiments.

Overview of the Object Pose Determination System

Images of one or more local surfaces are captured to determine a pose of an object of interest. Image capture occurs while illuminating the local surfaces with a structured light pattern. Image data is analyzed and a data set is determined from the shape of the projected structured light incident on the local surface. The data set represents, or corresponds to, surface contours of the local surface. Data sets, described in greater detail below, are compared with previously learned data sets of the corresponding local surface in an ideal pose. Differences from the comparison allow determination of a partial pose for the local surface. Partial poses of individual local surfaces are referenced to each other to determine the complete pose of the object of interest.

Figure 1:
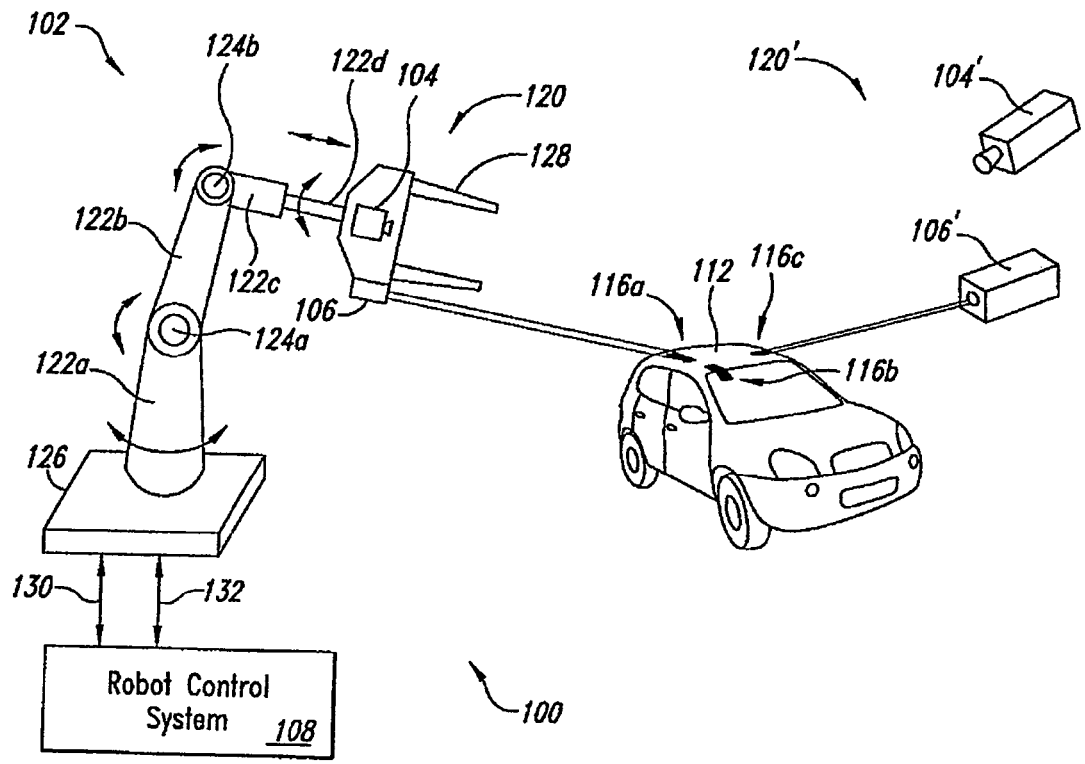
FIG. 1 is an isometric view of an object pose determination system employing at least one image capture device and a structured light source according to one illustrated embodiment.

FIG. 1 is an isometric view of an object pose determination system 100. In the illustrated embodiment, the object pose determination system 100 comprises a robot device 102, at least one image capture device 104, at least one structured light source 106, and a robot control system 108. The object pose determination system 100 is illustrated as determining pose (i.e., location and orientation) of an object of interest, illustrated for convenience as a vehicle 110 having a roof 112. Furthermore, the image capture device 104 and the structured light source 106 are illustrated as separate devices. In other embodiments, they may be the same device or may be housed in a common enclosure.

Object pose refers to position and orientation of an object in a three dimensional space. Pose of an object is typically referenced to a suitable reference coordinate system 114, such as the illustrated Cartesian coordinate system. Other types of reference coordinate systems may be used by alternative embodiments. Also, other objects, devices, and/or systems may have their own respective base coordinate systems, related to the reference coordinate system 114 through a known transformation. For example, image capture device 104 may have a base coordinate system which may be used to determine location information of an object in a captured image.

Embodiments of the object pose determination system 100 are operable to determine pose for an object of interest based upon captured image information from one or more local surfaces that may not have sufficient features or characteristics, by themselves, to determine the entire pose of the object of interest. Referring to FIG. 1, it is appreciated that pose of vehicle 110 is determinable once the pose of the roof 112 has been determined because the pose of the roof 112 is fixed relative to the pose of the vehicle 110. The roof 112 may be generally characterized as a surface that does not have at least one significant discernable unique feature, unique characteristic, and/or unique marking (such as a fiducial or the like) that would otherwise readily enable determination of the complete pose of the roof 112. That is, a conventional object pose determination system would have great difficulty determining, or may not be able to determine, the object pose of the roof 112 based upon imaging of the surface, such as roof 112, that is generally characterized by an absence of discernable unique features, characteristics, and/or markings.

Figure 2:
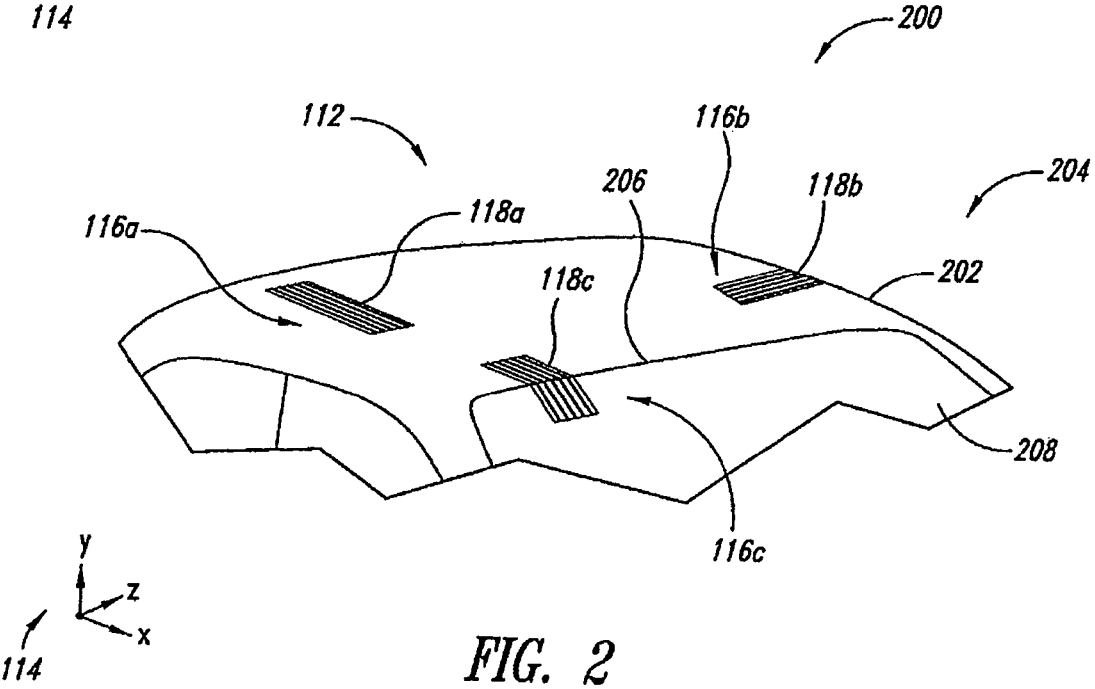
FIG. 2 is an enlarged isometric view illustrating in greater detail a portion of the vehicle roof of FIG. 1 having a plurality of local surfaces with structured light patterns projected thereon.

FIG. 2 is an enlarged isometric view 200 illustrating in greater detail a portion of the vehicle roof 112 having a plurality of local surfaces 116a-116c with structured light patterns 118a-118c projected thereon from the structured light source 106. To determine pose of the roof 112, images of one or more local surfaces 116a-116c are captured while the local surfaces 116a-116c are illuminated with a structured light pattern 118a-118c.

As noted above, data sets corresponding to the imaged local surface are determined from the captured images. The determined data sets are compared with previously determined reference data sets of the corresponding local surface. Reference data sets of the local surface are determined at training with the local surface in an ideal pose. Differences determined from the comparison allow determination of a partial pose for the local surface.

A complete pose of any individual one of the local surfaces 116a-116c may not be determinable because of the nature of the local surfaces 116a-116c (i.e.: an absence of at least one significant discernable unique feature, unique characteristic, or unique marking). However, once the partial poses of the individual local surfaces 116a-116c are determined, the partial poses are referenced to each other with respect to a coordinate system, such as the base coordinate system associated with the image capture device 104, the reference coordinate system 114, or another suitable base coordinate system. That is, the determined degrees of constraint which define the partial pose for the individual local surfaces 116a-116c are considered in aggregate to define a complete pose for the object of interest.

In the illustrated example of FIGS. 1 and 2, the objective is to determine the pose of the vehicle 110. The local surfaces 116a-116c on roof 112 are viewable by the image capture device 104. Partial poses (determined from determined degrees of constraint) of the local surfaces 116a-116c are determined. When the partial poses of the local surfaces 116a-116c are considered in aggregate, the complete pose of the roof 112 is determined. Then, a translation can be determined therefrom, which defines the complete pose of the vehicle 110.

In the illustrated exemplary embodiment, the image capture device 104 and the structured light source 106 are illustrated in a first pose 120 such that the field of view of the image capture device 104 is directed towards the local surface 116a, and such that the structured light source emits the structured light such that a structured light pattern 118a is projected onto the local surface 116a. When an image of local surface 116a is captured, a data set is determined from the captured image. At least one degree of constraint is determinable from the determined data set. Namely, in this simplified example, at least a height of the roof 112 is determinable. That is, a position of the roof 112 with respect to the y-axis of the reference coordinate system 114, or another coordinate system, is determinable.

For purposes of describing operation of the various embodiments, a degree of constraint is defined as a known position of an object point with respect to one degree of freedom of a coordinate system. In the example above, height of the roof 112 corresponds to a first degree of constraint. Here, height corresponds to the position of the local surface 116a with respect to the y-axis (one degree of freedom) of the reference coordinate system 114 (or another suitable coordinate system). Further, a partial pose is defined as a pose that is determined by one or more degrees of constraint, but where there are not a sufficient number of determined degrees of constraint such that a complete pose is determinable.

In this simplified example, it is appreciated that the above-described determination of the partial pose of local surface 116a (e.g., height of roof 112 determined from a captured image of the local surface 116a having the structured light pattern 118a projected thereon) is not sufficient to determine the complete pose of the roof 112. More degrees of constraint must be determined from the determined data set to determine the complete pose of the roof 112.

Accordingly, an image of a second local surface 116b is captured having a structured light pattern 118b projected thereon. In one embodiment, where the image capture device 104 and/or the structured light source 106 are mounted on the robot device 102 (described in greater detail hereinbelow), the robot device 102 is operated to adjust the position and orientation of the image capture device (now designated with reference numeral 104') and/or the structured light source (now designated with reference numeral 106') into a second pose (now designated with reference numeral 120'). Alternatively, a second image capture device and/or a second structured light source may be used for capturing the second image.

The second local surface 116b is appreciated to correspond to a portion of the roof 112 where the structured light pattern 118b is projected onto a top portion of the roof 112 and onto at least the edge 202. The structured light pattern 118b may even extend onto a side portion 204 of the vehicle 110, such as the driver's side window (not shown).

Based upon the second captured image, a second data set is determined. At least one second degree of constraint is determinable from the determined data set. For example, that portion of the structured light pattern 118b incident on the edge 202 (or on the side portion 204) allows determination of a degree of constraint corresponding to position of the second local surface 116b with respect to the z-axis of the reference coordinate system 114 (or another reference system). Thus, a second degree of constraint (e.g., position of the roof 112 with respect to the z-axis) may be determined from the second captured image.

Other degrees of constraint may also be determined from the determined second data set. For example, a third degree of constraint corresponding to the height of the roof 112 on the second local surface 116b could be determined. If the roof 112 is "flat" and/or if the vehicle 110 is located on a level surface, the previously determined first degree of constraint, corresponding height of the roof 112 of the first local surface 116a, would be equal to, or approximately equal to, the third degree of constraint determined from the second captured image. Or, the first and second degrees of constraint may be related by some known factor defined by a suitable translation.

Accordingly, in this simplified example, the above-described first and third degrees of constraint may be used to more accurately define the partial pose along the relevant axis (here, height of the roof 112). In one alternative embodiment, the first and third degrees of constraint may be averaged or otherwise combined to determine a composite degree of constraint. In other embodiments, after a sufficient number of partial poses are determined along a degree of constraint of interest, the most accurate one of a plurality of related degrees of constraint may be used to determine partial object pose.

Yet another degree of constraint is determinable from the exemplary second captured image (the fourth degree of constraint in this simplified example). Because the second structured light pattern 118b is incident on the top portion of the roof 112 and on the side portion of the roof 112, a view of the edge 202 (FIG. 2) of the roof 112 is visible in the second captured image. Accordingly, a fourth degree of constraint is determinable (e.g., angular orientation of the roof edge 202 with respect to the x-z plane) from the determined second data set.

The above-described second, third, and/or fourth degrees of constraint determined from the second captured image may be combined with the previously determined first degree of constraint determined from the first captured image. Accordingly, a partial pose of the roof 112 may be determined by combining the determined degrees of constraint with respect to the z-axis (e.g., position of the second local surface 116b determined from the second captured image), with respect to the y-axis (e.g., height of the roof 112 determined from the first captured image and/or the second captured image), and with respect to the x-z plane (e.g., angular orientation of the roof 112 determined from the second captured image). However, the complete pose of the roof 112 is not yet determinable since at least the position along the x-axis has not yet been determined.

Accordingly, an image of a third local surface 116c is captured having a structured light pattern 118c projected thereon. In one embodiment, where the image capture device 104 and/or the structured light source 106 are mounted on the robot device 102, the robot device 102 is operated to adjust the position and orientation of the image capture device 104 and/or the structure light source 106 into a third pose. Alternatively, another image capture device and/or another structured light source may be used for capturing the third image.

The third local surface 116c is incident on a portion of the top of the roof 112 and on at least a second edge 206 (FIG. 2) of the roof 112. The structured light pattern 118c may even extend onto the front window 208.

Based upon the third captured image, a third data set is determined. At least another degree of constraint is determinable (the fifth degree of constraint in this simplified example) from the determined third data set. For example, that portion of the structured light pattern 118c incident on the second edge 206 (or on the window 208) allows determination of a degree of constraint corresponding to the position of the roof 112 with respect to the x-axis of the reference coordinate system 114. Thus, a fifth degree of constraint (e.g., position of the roof 112 with respect to the x-axis) that has been determined from the third captured image may be used to determine the partial pose of the third local surface 116c.

Other degrees of constraint may be determinable from the third captured image. For example, another degree of constraint corresponding to the height of the roof 112 (with respect to the y-axis) could be determined to more accurately determine the above-described composite degree of constraint corresponding to height of the roof 112.

The above-described degrees of constraint determined from the third captured image may be combined with the previously determined first, second, third, and/or fourth degrees of constraint. Accordingly, position of the roof 112 with respect to the x-axis (determined from the third captured image), position of the roof 112 with respect to the z-axis (determined from the second captured image), height of the roof 112 with respect to the y-axis (determined from the first and/or second captured images), and angular position of the roof 112 with respect to the x-y plane (determined from the second captured image) may be combined to determine a partial pose of the roof 112.

At this point in the exemplary pose determination example, position along the x-axis, position along the y-axis, position along the z-axis, and orientation on the x-z plane has been determined from the three determined partial poses of the three local surfaces 116a-116c. Additionally, one or more of the partial poses of the three local surfaces 118a-118c may include orientation of the local surface in the y-z plane and/or x-y plane. For example, if the roof 112 is not at the same level, for example if one or more of the vehicle wheels were not pressurized the same as the test vehicle, the local surface 118a may allow determination of pose along the y-z plane and/or x-y plane.

Further, the translation relating the pose of the three local surfaces 116a-116c with respect to each other is known or determinable. Assuming that the vehicle 110 is located on a level surface, which provides for degrees of constraint in the x-y plane and the y-z plane, a complete pose of the roof 112 is now determinable. That is, the determined degrees of constraint corresponding to the plurality of partial poses for the three local surfaces 116a-116c may be combined and/or correlated to determine a complete pose of the roof 112. Furthermore, because the relationship between the vehicle 110 and the roof 112 is known, a translation is determinable such that pose of the vehicle 110 is determinable.

In the event that orientation of the roof 112 in the x-y plane and/or the y-z plane is not determinable, additional images of other local surfaces having a structured light pattern projected thereon may be captured and analyzed to determine additional degrees of constraint. In some embodiments, the process of capturing images of local surfaces in a closed loop process continues until the pose of the object of interest is determined with a requisite degree of accuracy and/or reliability.

Robotic System

As noted above, in some embodiments, the image capture device 104 and/or the structured light source 106 are repositioned about the object of interest such that images of a plurality of local surfaces having a structured light pattern thereon are captured. With reference to FIG. 1, the illustrated embodiment of the robot device 102 comprises a plurality of robot device members 122a-122d, a plurality of joints 124a-124b, a base 126, and an optional end effector 128. Accordingly, the robot device 102 is operable to maneuver at least one of the plurality of robot device members 122a-122d through a workspace.

A plurality of servomotors and other suitable actuators (not shown) of the robot device 102 are operable to move the various members 122a-122d. The robot device 102 moves the image capture device 104 and/or the structured light source 106 by adjusting the position of its various members 122a-122d. Rotational movement of the robot device 102 may occur about the joint 124a, which couples the members 122a-122b, and/or about the joint 124b, which couples the members 122b-122c. In the exemplary robot device 102, translational movement of the image capture device 104 may be made by extending or retracting member 128d. Further rotational movement may be made about the base 126. In some embodiments, base 126 may be moveable. Accordingly, the image capture device 104 and/or the end effector 128 may be positioned and/or oriented in any desirable manner to capture images of portions of the object 110.

Similarly, the optional end effector 128 may be positioned and/or oriented in any desirable manner such that the end effector 128 may perform work operations on object 110 from any position and/or orientation of interest. It is appreciated that the exemplary embodiment of the robot device 102 may be comprised of fewer, of greater, and/or of different types of members such that any desirable range of rotational and/or translational movement of the end effector 128 may be provided. Also, the end effector is illustrated as a simplified grasping device. Any suitable type of end effector 128 may be used to perform a task in a work area may be used.

Robot control system 108 receives information from the various actuators indicating position and/or orientation of the members 122a-122d. Because of the known dimensional information of the members 122a-122d, angular position information provided by joints 124a and 124b, and/or translational information provided by telescoping member 122d, pose of the image capture device 104 and/or the structured light source 106 is precisely determinable at any point in time. That is, robot control system 108 may computationally determine pose of the image capture device 104 and/or the structured light source 106 with respect to the reference coordinate system 114. Since pose of the image capture device 104 is known, the field of view of the image capture device 104 is known. Similarly, since pose of the structured light source 106 is known, the direction of the projected structured light patterns 118a-118c from the structured light source 106 is also known.

The image capture device 104 and/or the structured light source 106 are illustrated as physically mounted to the end effector 128 for convenience. In alternative embodiments, the image capture device 104 may be mounted on a moveable structure (not shown) to provide for rotational, pan, tilt, and/or other types of movement such that the image capture device 104 may move independently with respect to the structured light source 106, as described in greater detail hereinbelow. In yet other embodiments, the image capture device 104 and the structured light source 106 are separately mounted so that they are independently moveable with respect to each other. In such alternative embodiments, the image capture device 104 may be re-positioned and/or re-oriented in a desired pose to capture additional images of a particular local surface having a structured light pattern thereon.

As used herein, a "translation" denotes a function which converts pose information from one coordinate system to another coordinate system. For example, when pose information of an object is determined from a captured image with respect to the image capture device base coordinate system, a translation is determinable which translates the determined object pose to the reference coordinate system 114. Another translation may be used to convert the pose to yet another coordinate system, such as the robot coordinate system. Alternatively, a single translation may be used to convert the pose of the object from the image capture device base coordinate system to the robot coordinate system.

Capturing Multiple Images To Determine Pose

As noted above, image capture device 104 captures an image of a local surface with the structured light pattern projected thereon. In some embodiments, the single captured image is analyzed to determine the partial pose for the local surface.

In some applications, the degree of constraint(s) determined from a single captured image may not be sufficient to determine the partial pose for the local surface with a desired level of accuracy and/or reliability. Accordingly, alternative embodiments capture a plurality of images of the local surface with the image capture device 104 in different positions and/or orientations.

For each captured image of the local surface having a structured light pattern projected thereon, a different data set is determinable. The data sets may be averaged, combined, correlated, or otherwise analyzed as a group to determine a more accurate and reliable partial pose for the local surface. In other embodiments, the degree(s) of constraint determined from each one of the plurality of captured images may be averaged, combined, correlated, or otherwise analyzed as a group. In yet other embodiments, the partial pose determined for each one of the plurality of captured images may be averaged, combined, correlated, or otherwise analyzed as a group.

Figure 3:
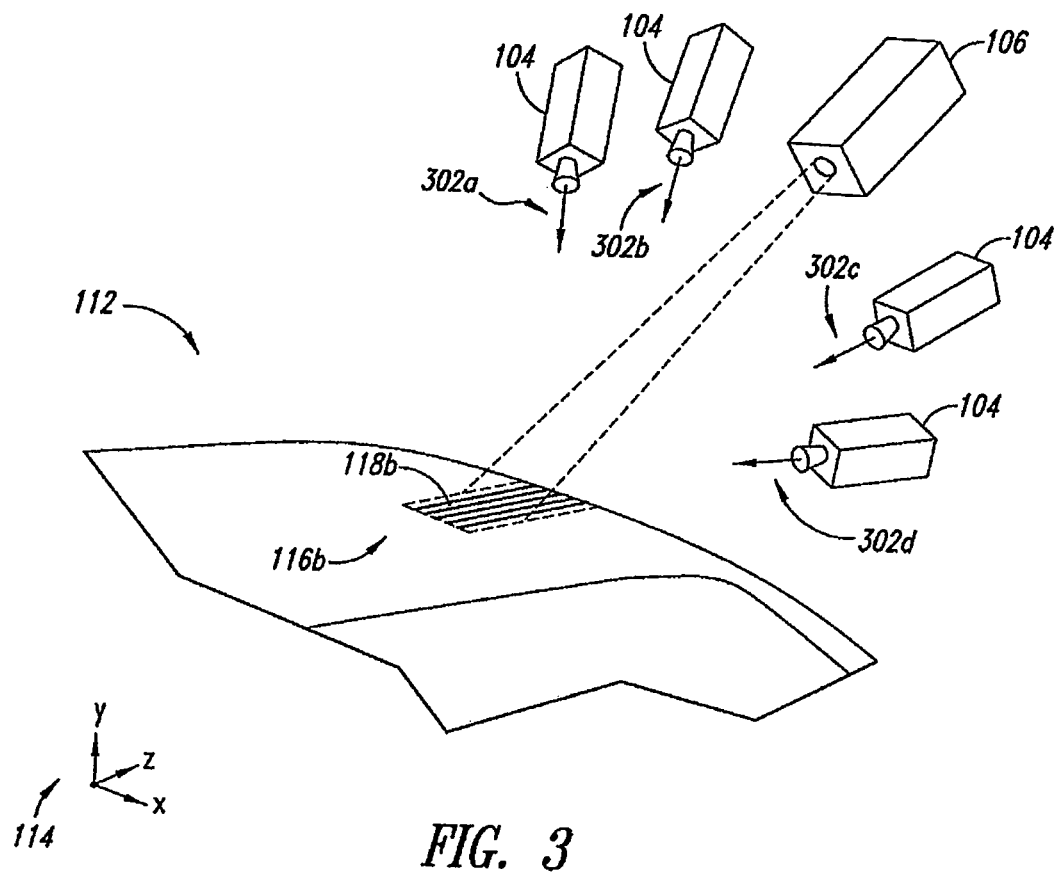
FIG. 3 is an isometric view illustrating in yet greater detail the portion of the vehicle roof with the local surface having the structured light pattern projected thereon.

FIG. 3 is an isometric view 300 illustrating in yet greater detail the portion of the vehicle roof 112 with the local surface 116a having the structured light pattern 118b projected thereon. In FIG. 3, a single image capture device 104 is illustrated in four different positions and orientations 302a-302d. The illustrated vector projected from the lens 304 of the image capture device 104 corresponds to the field of view of the image capture device 104. Accordingly, it is appreciated that FIG. 3 illustrates that four captured images are taken of the local surface 116b while the structured light 118b is projected thereon. In this example, the structured light source 106 is stationary. In some embodiments, the structured light source 106 also is moved. The structured light source 106 may be moved with the image capture device 104, may be moved to another location independent of the movement of the image capture device 104, or may be moved while the image capture device 104 is stationary.

Since the field of view and/or the structured light pattern changes for each captured image, the data sets determined from each captured image will vary. Also, the determined partial pose for the local surface may vary from image to image. Further, the determined degrees of constraint may vary from image to image. As noted above, the determined data sets, partial poses, and/or degrees of constraint may be compared to determine a more accurate and reliable partial pose for the local surface 116b.

In alternative embodiments, an image capture system having a plurality of image capture devices (not shown) may be used to capture images of the local surface. For example, with respect to FIG. 3, four separate image capture devices could capture the four images of the local surface 116b. In other alternative embodiments, a structured light source system having a plurality of structured light sources could be used to sequentially project structured light, at different orientations, onto the local surface such that a plurality of images are captured, each having a different structured light pattern. Some embodiments may use optical elements such as movable reflectors, prisms, mirrors, etc. to sequentially project structured light, at different orientations or an orientation of interest onto the local surface. In embodiments where a plurality of images are captured, each captured image may have a different structured light pattern and/or orientation. In yet other embodiments, a plurality of image capture devices and a plurality of structured light sources may be operated in a coordinated manner to capture a plurality of images of the local area. In these various embodiments, the determined data sets, degrees of constraint, and/or partial poses are compared to determine a more accurate and reliable partial pose for the local surface of interest.

Data Sets

As noted above, data sets are determined from captured images of a local surface having a structured light pattern projected thereon. In at least one embodiment, the determined data set corresponds to a point cloud. Alternative embodiments determine data sets using other suitable formats.

Figure 4:
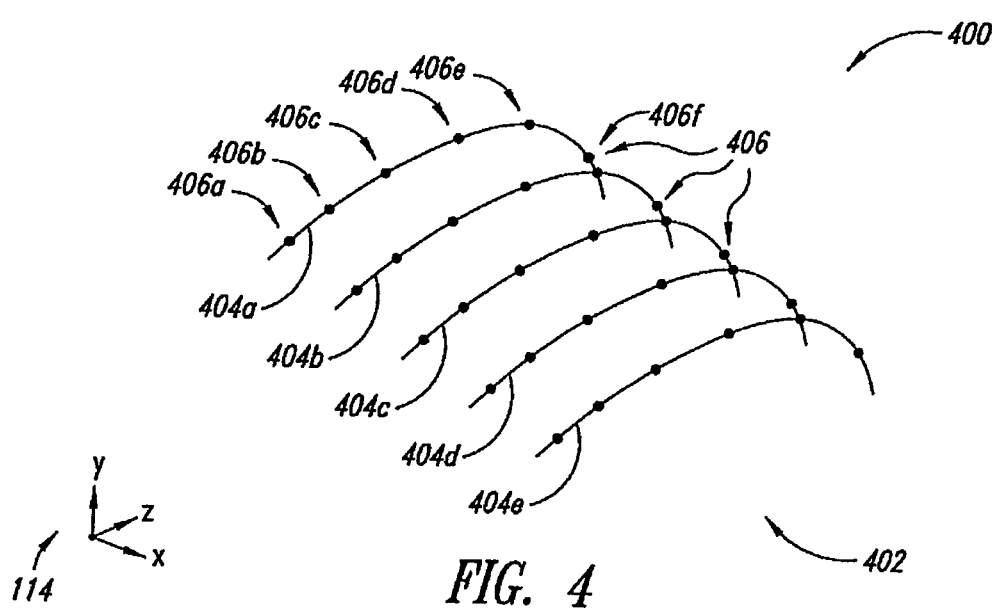
FIG. 4 is an isometric view illustrating an exemplary point cloud determined from a captured image of a local surface (see also FIGS. 1 and 2) in an ideal pose.

FIG. 4 is an isometric view 400 illustrating an exemplary reference point cloud 402 (the group of illustrated points) determined from a captured image of a local surface 116a (see also FIGS. 1 and 2) in an ideal pose. The captured image used to determine the exemplary reference point cloud 402 may have been captured during a previously performed training process.

Five lines 404a-404e are illustrated in FIG. 4. The lines 404a-404e correspond to the structured light pattern 118b (FIGS. 1 and 2) comprising five lines of structured light projected onto a reference local surface. The curvature of the lines 404a-404e graphically represents the contour of the second local surface 116b (FIG. 2) that corresponds to the top portion of the roof 112 and the edge 202 in the above-described simplified example. Lines 404a-404e are referred to hereinafter as "contour lines" for convenience.

For each visible contour line 404a-404e, a position of one or more points 406 of the reference point cloud 402 are determined in three dimensional space with respect to the reference coordinate system 114 (or to another suitable base coordinate system related to at least the reference coordinate system 114 through a known transformation). Collectively, the points 406 are referred to as a "point cloud" herein. Information corresponding to position of individual points 406, and/or position and orientation of the contour lines 404a-404e, and/or position and orientation of the point cloud 402 are referred to herein as a reference data set.

From the reference data set, one or more reference degrees of constraint may be determined for the reference object in the ideal pose. Depending upon the embodiment, the reference data sets or the reference degrees of constraint may be compared with respective data sets or degrees of constraint from images of the object of interest captured at run time, described in greater detail below.

Various systems for capturing images of structured light patterns, and the associated determination of point clouds and/or data sets may be employed. An example of vision inspection of surfaces using structured light stripes is found in the paper "Complete Calibration Of A Structured Light Stripe Vision Sensor Through Planar Target Of Unknown Orientations," Fuqiang Zhou and Guangjun Zhang, Jul. 7, 2004, which is incorporated herein by reference in its entirety. For brevity, a detailed description of using a captured image of structured light projected onto a surface to determine a data set is not provided herein other than to the extent necessary to describe the various embodiments of the object pose determination system 100.

Comparing Data Sets to Determine Partial Pose

Figure 5:
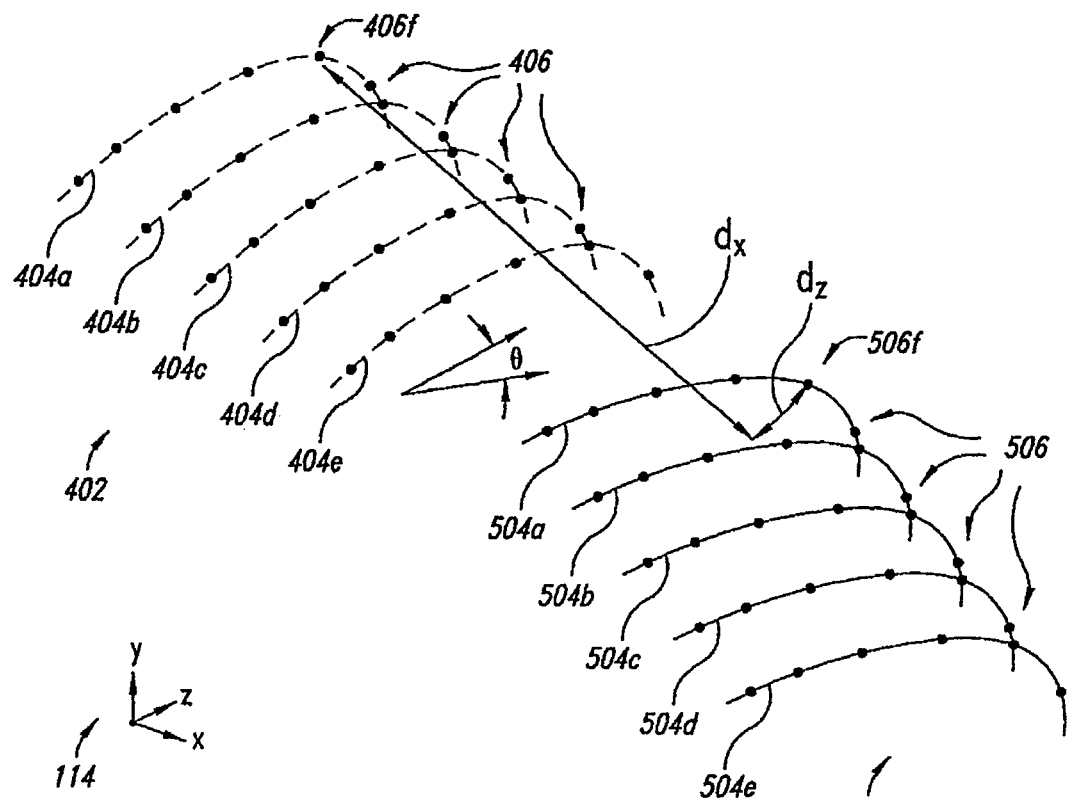
FIG. 5 is a comparative isometric view illustrating the ideal pose point cloud of FIG. 4 and a point cloud determined from an imprecisely posed object at run time.

FIG. 5 is a comparative isometric view 500 illustrating the reference point cloud 402 of FIG. 4 and a point cloud 502 determined from an object of interest at run time. The five contour lines 504a-504e illustrated in FIG. 5 are associated with the object of interest. The contour lines 504a-504e correspond to the structured light pattern 118b (FIGS. 1 and 2) comprising five lines of projected structured light. The curvature of the lines 504a-504e graphically represents the contour of the second local surface 116b (FIG. 2) that corresponds to the top portion of the roof 112 and the edge 202 in the above-described simplified example when the image is captured at run time. FIG. 5 also shows the five reference contour lines 404a-404e of the previously illustrated reference point cloud 402 (FIG. 4).

For purposes of describing the relationship between the reference point cloud 402 and the run-time point cloud 502, assume that the point clouds 402 and 502 are located at the same height from the reference coordinate system 114 (z-axis). That is, since the reference point cloud 402 was determined from the roof of a reference vehicle identical to the roof 112 of vehicle 110, an assumption is made that the roof of the reference vehicle was at the same height (and/or flat) as the roof 112 of the vehicle 110 when the image of the above-described second local surface 116a is captured. Accordingly, the degree of constraint of the cloud points with respect to the y-axis of the reference coordinate system 114 is fixed since the heights of the vehicle roofs are the same.

Like the reference point cloud 402, the run-time point cloud 502 comprises a plurality of points 506. Information corresponding to the points 506 comprises a run-time data set. In an exemplary embodiment, the point 506f of the run-time point cloud 502 corresponds to the point 406f of the reference point cloud 402. The difference in position between the point 506f and the point 406f is illustrated as $d_x$ (along the x-axis of the reference coordinate system 114) and as $d_z$ (along the z-axis). The distances $d_x$ and $d_z$ define a position difference between the reference point cloud 402 and the run-time point cloud 502. In alternative embodiments, the run-time point cloud 502 may be used to independently determine partial pose of a local surface since orientation of the run-time point cloud 502 (and/or one or more cloud points therein) may be determined with respect to the known orientation of the image capture device, orientation of the structured light source, orientation of the structured light pattern, and/or orientation of another known object.

However, a relationship between reference point cloud 402 and the run-time point cloud 502 cannot yet be determined because the reference point cloud 402 is not at the same angular orientation as the run-time point cloud 502, as indicated by the illustrated angle ϕ. Accordingly, location of a plurality of points 506 of the run-time point cloud 502 may be analyzed with a corresponding a plurality of points 406 of the reference point cloud 402 to define the orientation difference (represented by the angle ϕ) between the run-time point cloud 502 and the reference point cloud 402.

In this simplified example where the reference point cloud 402 and the run-time point cloud 502 are at the same height (y-axis position), the partial pose of the local surface 116b (FIGS. 1-3) is determinable by determining the distances $d_x$ and $d_z$, and the angle ϕ. Accordingly, a translation between the reference point cloud 402 and the run-time point cloud 502 can be defined. The translation comprises at least three degrees of constraint (e.g., position along the x-axis, position along the z-axis, and orientation in the x-z plane).

In a similar manner, when the degree of constraint is determined for the z-axis (e.g., height of roof 112) from an image of local surface 116a as described above, and when the degree of constraint is determined for the x-axis (e.g., position of the roof 112), the degrees of constraint determined from the three local surfaces 116a-116c (FIGS. 1-3) may be combined or analyzed together to determine a complete pose of the roof 112.

Exemplary Robot Control System

The above-described simplified example conceptually demonstrates how an embodiment of the object pose determination system 100 determines a complete pose of an object of interest by capturing images of a plurality of local surfaces, determining partial poses of the local surfaces, and then combining the partial poses to determine the complete pose of the object of interest. In practice, the determined point clouds, or data sets used by other embodiments, may contain more points or information than implied by the simplified example above. However, given the sophistication of processing systems available for image analysis, embodiments of the object pose determination system 100 may quickly analyze a plurality of captured images with structured light patterns projected thereon, and determine and process a plurality of very large data sets, such that compete pose of an object of interest can be determined on a real-time, or near real-time, basis.

Figure 6:
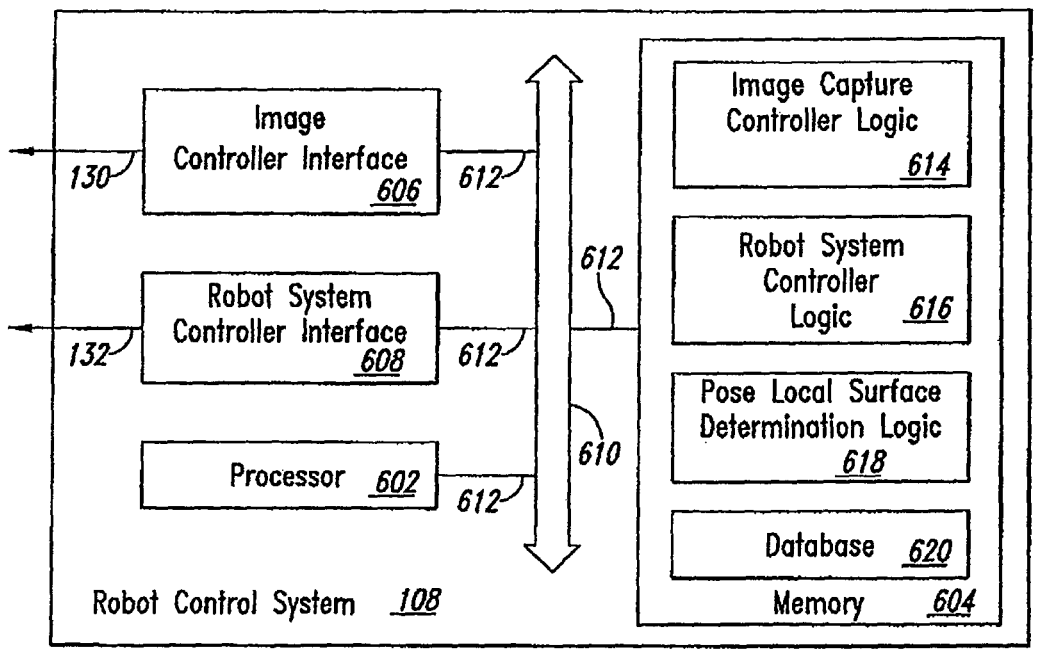
FIG. 6 is a block diagram of the robot control system of FIG. 1.

FIG. 6 is a block diagram illustrating selected components of an exemplary robot control system 108 (FIG. 1). Other components and/or systems (not shown) residing in the exemplary robot control system 108 are not illustrated or described herein for brevity and convenience.

The robot control system 108 comprises a processor 602, a memory 604, an image capture controller interface 606, and a robot system controller interface 608. For convenience, processor 602, memory 604, and interfaces 606, 608 are illustrated as communicatively coupled to each other via communication bus 610 and connections 612, thereby providing connectivity between the above-described components. In alternative embodiments of the robot control system 108, the above-described components may be communicatively coupled in a different manner than illustrated in FIG. 6. For example, one or more of the above-described components may be directly coupled to other components, or may be coupled to each other, via intermediary components (not shown). In some embodiments, communication bus 610 is omitted and the components are coupled directly to each other using suitable connections.

Image capture control logic 614, residing in memory 604, is retrieved and executed by processor 602 to determine control instructions to cause the image capture device 104 to capture an image of at least one local surface. Captured image data is then communicated to the robot control system 108 for processing. In some embodiments, captured image data preprocessing may be performed by the image capture device 104.

Also, image capture control logic 614 determines control instructions to cause the structured light source 106 to project a structured light pattern onto the local surface at least at the time of image capture. In an alternative embodiment, logic to control the structured light source 106 may be implemented separately from the logic controlling image capture device 104.

Control instructions, determined by the image capture device control logic 614, are communicated to the image capture controller interface 606 such that the control signals may be properly formatted for communication to the image capture device 104 and/or the structured light source 106. For example, control instructions may control when an image of the vehicle 110 is captured. As noted above, the image capture device 104 may be mounted on a moveable structure to provide for rotational, pan, tilt, and/or other types of movement. Accordingly, control instructions would be communicated to the image capture device 104 such that the image capture device 104 is positioned and/or oriented with a desired field of view to capture the image of a local surface. Control instructions may control other image capture functions such as, but not limited to, focus, zoom, resolution, color correction, and/or contrast correction. Also, control instructions may control the rate at which images are captured if multiple images of a local surface are captured. Similarly, control instructions may control other functions of the structured light source 106, such as, but not limited to, pattern focus, pattern characteristics, pattern orientation, pattern color correction, and/or pattern contrast correction.

Image capture device 104 and/or the structured light source 106 are illustrated as being communicatively coupled to the image capture controller interface 606 via connection 130. For convenience, connection 130 is illustrated as a hardwire connection. However, in alternative embodiments, the robot control system 108 may communicate control instructions to the image capture device 104 and/or receive captured image data from the image capture device 104 using alternative communication media such as, but not limited to, radio frequency (RF) media, optical media, fiber optic media, or any other suitable communication media. Similarly, in alternative embodiments, the robot control system 108 may communicate with the structured light source 106 using alternative communication media. In other embodiments, image capture controller interface 606 is omitted such that another component, or processor 602, communicates directly with the image capture device 104 and/or the structured light source 106.

Robot system controller logic 616, residing in memory 604, is retrieved and executed by processor 602 to determine control instructions for moving components of the robot device 102. For example, the pose of image capture device 104 may be adjusted to capture images of different local surfaces and/or may be adjusted to capture multiple images of a single local surface. Control instructions are communicated from processor 602 to the robot device 102 via the robot system controller interface 608. Robot system controller interface 608 formats the control signals for communication to the robot device 102. Robot system controller interface 608 also receives position information from the robot device 102 such that the pose of the robot device 102 and its components are determinable by the robot system controller logic 616.

Robot system controller interface 608 is illustrated as being communicatively coupled to the robot device 102 via connection 132. For convenience, connection 132 is illustrated as a hardwire connection. However, in alternative embodiments, the robot control system 108 may communicate control instructions to the robot device 102 using alternative communication media, such as, but not limited to, RF media, optical media, fiber optic media, or any other suitable communication media. In other embodiments, robot system controller interface 608 is omitted such that another component or processor 602 communicates command signals directly to the robot device 102.

The local surface pose determination logic 618 resides in memory 604. As described in greater detail hereinbelow, the various embodiments determine the partial pose (position and/or orientation) of local surfaces using the local surface pose determination logic 618, which is retrieved from memory 604 and executed by processor 602. In one embodiment, the local surface pose determination logic 618 contains at least instructions for processing the received captured image data, instructions for determining partial pose of at least one local surface, and instructions for determining complete pose of the object of interest, as described herein. Other instructions may also be included in the local surface pose determination logic 618, depending upon the particular embodiment.

Database 620 resides in memory 604. As described in greater detail herein, the various embodiments analyze captured image data to determine partial pose of at least one local surface. Captured image data may be stored in database 620. Reference data sets may also reside in database 620. Any suitable model type and/or format may be used for the reference data sets. Models of the robot device 102, previously learned paths of motion associated with various tasks performed by the robot device 102, object definitions, and/or tool definitions may also reside in database 620.

It is appreciated that the above-described logic, captured image data, and/or pose information may reside in other memory media in alternative embodiments. For example, captured image data may be stored in another memory or buffer and retrieved as needed. Reference data sets and models of object, tools, and/or robot devices may reside in a remote memory and be retrieved as needed, depending upon the particular application and the particular robot device performing the application. It is appreciated that systems and methods of storing information and/or models are nearly limitless. Accordingly, for brevity, such numerous possible storage systems and/or methods cannot be conveniently described herein. All such variations in the type and nature of possible storage systems and/or methods employed by various embodiments of an object pose determination system 100 are intended to be included herein within the scope of this disclosure.

Exemplary Processes Of Determining Pose From A Plurality Of Local Surfaces

Figure 7:
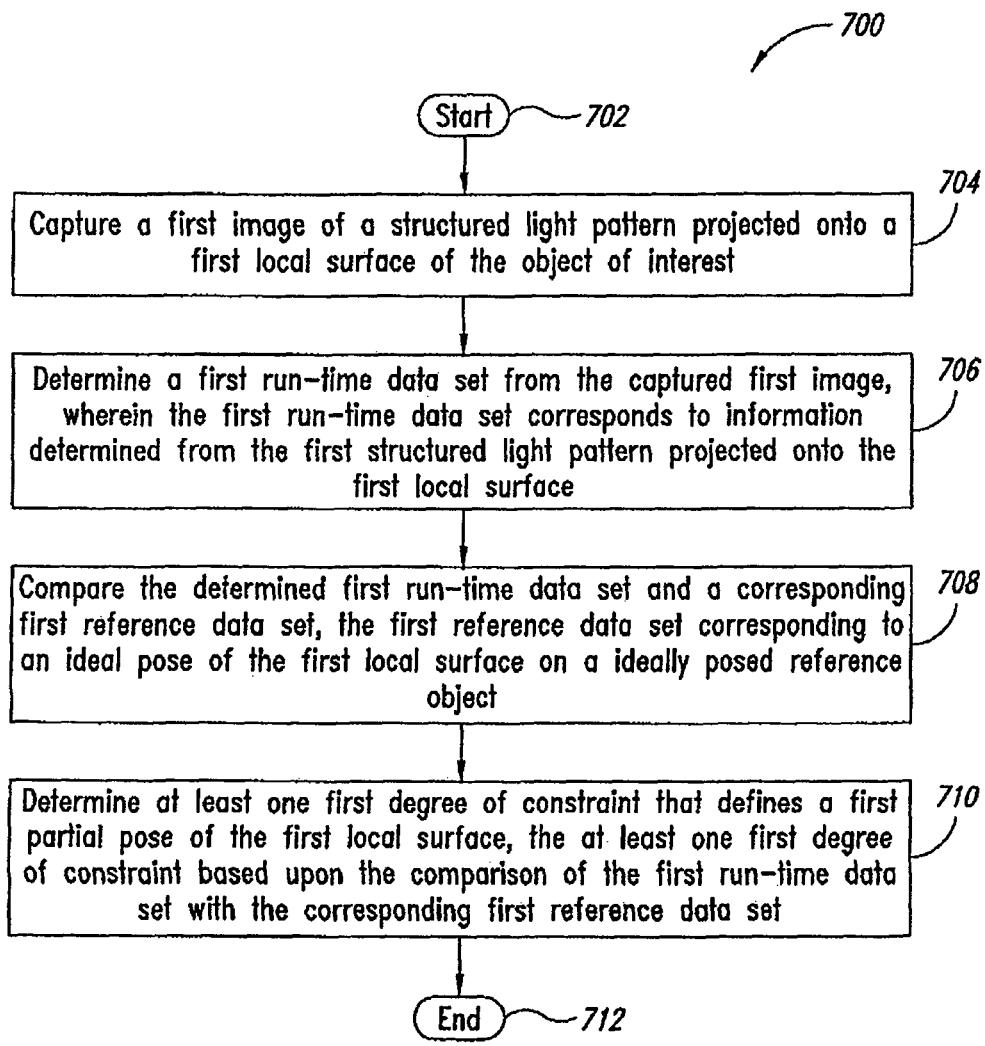
FIGS. 7-9 are flow charts illustrating various embodiments of a process for determining the pose of an object of interest.
Figure 8:
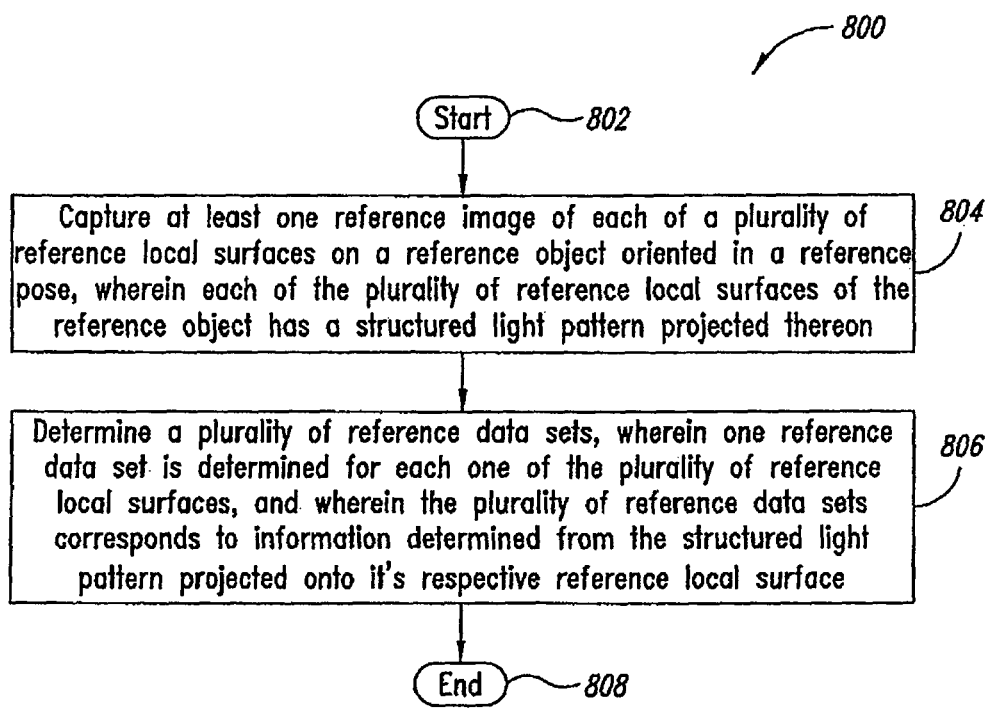
Figure 9:
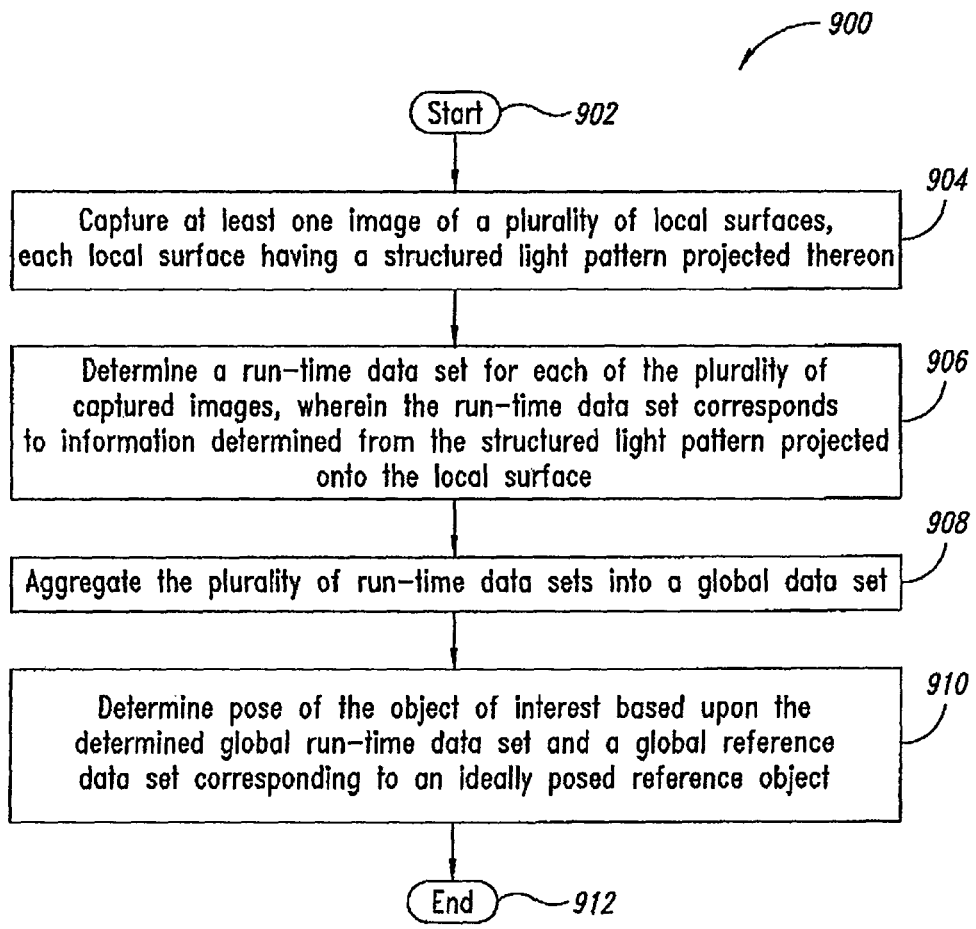

FIGS. 7 and 8 are flow charts illustrating various embodiments of a process 700 and 800, respectively, for determining a pose of an object of interest. The flow charts show the architecture, functionality, and operation of a possible implementation of the software for implementing the image capture control logic 614 (FIG. 6) and/or the robot system controller logic 616. In this regard, each block may represent a module, segment, or portion of code which comprises one or more executable instructions for implementing the specified logical function(s). It should also be noted that in some alternative implementations, the functions noted in the blocks may occur out of the order noted in FIGS. 7 and/or 8, may include additional functions, and/or may omit some functions. For example, two blocks shown in succession in FIGS. 7 and/or 8 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

With respect to FIG. 7, the process 700 process starts at block 702, for example, in response to the starting or powering up of the system or in response to a signal from a sensor or user interface. At block 704, a first image of a first structured light pattern projected onto a first local surface of the object of interest is captured. A first run-time data set is determined from the captured first image, wherein the first run-time data set corresponds to information determined from the first structured light pattern projected onto the first local surface at block 706. The determined first run-time data set and a corresponding first reference data set are compared at block 708, wherein the first reference data set corresponds to an ideal pose of the first local surface on an ideally posed reference object. At 710, at least one first degree of constraint is determined that defines a first partial pose of the first local surface, the at least one first degree of constraint based upon the comparison of the first run-time data set with the corresponding first reference data set. The process ends at block 712.

With respect to FIG. 8, the process 800 starts at block 802, for example, in response to the starting or powering up of the system or in response to a signal from a sensor or user interface. At block 804, at least one reference image of each of a plurality of reference local surfaces on a reference object oriented in a reference pose is captured, wherein each of the plurality of reference local surfaces of the reference object has a structured light pattern projected thereon. A plurality of reference data sets are determined, wherein one reference data set is determined for each one of the plurality of reference local surfaces and wherein the plurality of reference data sets corresponds to information determined from the structured light pattern projected onto its respective reference local surface at block 806. The process ends at block 808.

Alternative Embodiments

For convenience, the illustrated object of interest (FIG. 1) is a vehicle 110 and, more particularly, the roof 112 of the vehicle. As noted above, the roof 112 is generally characterized as a surface or the like that does not have significant discernable unique features, unique characteristics, or unique markings (such as a fiducial or the like) that would otherwise readily enable determination of the pose of an object of interest. For brevity, such varied types of objects, large or small, cannot be described herein. All such variations in the type, size, and/or functionality of an object of interest for which pose is determined by various embodiments of an object pose determination system 100 are intended to be included within the scope of this disclosure.

Alternative embodiments may optionally include supplemental object and pose determination logic operable to determine object pose based upon recognizable features, unique characteristics, and/or unique markings. For example, a portion of the object of interest may include one or more recognizable features that are, by themselves, sufficient to determine object pose. If the embodiment captures an image of the object of interest where one or more of the recognizable features are discernable, object pose may be directly and/or immediately determined from the visible feature. As another example, if a fiducial is visible in a captured image, pose may be directly and/or immediately determined from the visible fiducial. However, if the feature, characteristic, or unique marking is not visible or discernable, then object pose may be determined based upon a plurality of local surfaces, as described herein. Some alternative embodiments may integrate the above-described local surface pose determination logic 618 with conventional pose determination logic. In other embodiments, the local surface pose determination logic 618 may be added to an existing conventional pose determination system and operate in a default mode or the like in the event that the conventional pose determination system is unable to determine object pose.

In the various embodiments described above, partial pose of local surfaces are determined from captured images having a structured light projected thereon. In alternative embodiments, one or more degrees of constraint are determinable by other, non-image based devices. That is, a non-image based detector may detect a local surface such that at least one degree of constraint is determinable. For example, returning to the roof 112 (FIG. 1), a radar detector, acoustic detector, infrared detector, ultrasound detector or the like may be used to detect the height of the roof 112, which corresponds to a first degree of constraint. Or, a touch-sensitive device may detect the physical presence of the roof 112 such that the height is determinable. All such variations in the type, size, and/or functionality of alternative image-based devices and/or non-image based devices used to determine a degree of constraint used by various embodiments of an object pose determination system 100 are intended to be included within the scope of this disclosure.

Furthermore, alternative embodiments may capture image-type information using other devices, such as radar devices, sonar devices, acoustic devices, infrared devices or ultrasound devices. These alternative devices emit electromagnetic energy, the structured light pattern, towards the local surface. These devices capture returning information that may be used to determine point clouds and their associated data sets. However, with such devices, the structured light patterns may not be in the visible range of the electromagnetic spectrum. Also, one or more point sources of electromagnetic energy may be emitted from the alternative type device onto the local surface, thus constituting the structured light pattern. The information acquired from the local surface with such devices may be used to determine partial pose of the local surface and/or complete pose of the object of interest. Such embodiments may be desirable in determining pose when the object of interest, or a local surface of the object of interest, is in a medium that is not well suited for the above-described image capture device 104.

A plurality of the above-described data sets, such as the exemplary point cloud 502 (FIG. 5), may be independently analyzed to determine partial pose of a local surface. The determined partial poses of the plurality of local surfaces may then be combined or considered in aggregate to determine complete pose of the object of interest. In alternative embodiments, the data sets are combined into a global data set after they are determined or as they are determined. Then, the global data set is compared to a reference global data set such that complete pose of the object of interest is determined during a single comparison process. That is, the intermediary step of determining partial poses of local surfaces is not required since a single object pose is determined from the comparison of the global data set and the reference global data set.

In alternative embodiments, selective subsets of the acquired surface data may be used for pose calculation. That is, instead of using all points in a point cloud, selected points may be used to determine partial pose of a local surface. In some embodiments, points may be selected randomly. In other embodiments, points may be selected that meet predefined criteria. For example, points that are in the vicinity of a sudden slope change in the structured light pattern (representing edge points, sharp corners) may be selected. Any suitable criteria of interest may be used to define a subset of the acquired surface data. Furthermore, the acquired surface data may be in another form at the time of selection. For example, image data subsets may be defined prior to determining cloud points.

In at least one embodiment, the structured light source 106 is a laser light device operable to generate and project the structured light onto a local surface. Such laser-based structured light sources 106 are well known and are not described in detail herein for brevity. In alternative embodiments, other types of structured light sources may be used. One exemplary type of structured light source 106 projects a moiré fringe pattern onto the local surface. Any suitable source of light operable to generate and project a structured light pattern onto a local surface is intended to be included within the scope of this disclosure.

Furthermore, the structured light pattern of the preferred embodiment employs a plurality of lines. In other embodiments, other structured patterns may be used to determine partial pose of a local surface. For example, the structured pattern may be comprised of a plurality of perpendicular lines or concentric patterns, such as circles, squares, triangles, or the like. Furthermore, different structured light patterns may be projected onto different local surfaces. Any suitable structured light pattern is intended to be included within the scope of this disclosure.

In the illustrated preferred embodiment, the image capture device 104 and the structured light source 106 (FIG. 1) are illustrated and described as mounted onto a common robot device 102. In alternative embodiments, the image capture device 104 and the structured light source 106 are separately mounted. They may be separately mounted on other robot devices or may be mounted on a fixed structure. Furthermore, an optional end effector 128 was coupled to the robot device. In alternative embodiments, the robot device to which the image capture device 104 and/or the structured light source 106 are mounted does not include an end effector. That is, the robot device is dedicated to changing the position and/or orientation of the image capture device 104 and/or the structured light source 106 so that a plurality of images of one or more local surfaces may be captured. All such variations are intended to be included within the scope of this disclosure.

In the above-described embodiment of the robot control system 108 (FIG. 6), image capture control logic 614, robot system controller logic 616, local surface pose determination logic 618, and database 620 were described as residing in memory 604 of the robot control system 108. In alternative embodiments, the logic 614, 616, 618, and/or database 620 may reside in another suitable memory medium (not shown). Such memory may be remotely accessible by the robot control system 108. Or the logic 614, 616, 618, and/or database 620 may reside in a memory of another processing system (not shown). Such a separate processing system may retrieve and execute the logic 614, 616, and/or 618, and/or may retrieve and store information into the database 620.

For convenience, the image capture control logic 614, robot system controller logic 616, and local surface pose determination logic 618 are illustrated as separate logic modules in FIG. 6. It is appreciated that illustrating the logic modules 614, 616, and 618 separately does not affect the functionality of the logic. Such logic 614, 616, and 618 could be coded separately, together, or even as part of other logic without departing from the spirit and intention of the various embodiments described herein. All such embodiments are intended to be included within the scope of this disclosure.

In the above-described various embodiments, the robot control system 108 (FIG. 1) may employ a microprocessor, a digital signal processor (DSP), an application specific integrated circuit (ASIC) and/or a drive board or circuitry, along with any associated memory, such as random access memory (RAM), read only memory (ROM), electrically erasable read only memory (EEPROM), or other memory device storing instructions to control operation.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other object engaging systems, not necessarily the exemplary robotic system embodiments generally described above.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via ASICs. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using time-division multiplexing or internet protocol based communication links (e.g., packet links).

Reference throughout this specification to "one embodiment" or "an embodiment" means that a particular feature, structure, or characteristic described in connection with the embodiment is included in at least one embodiment of the present systems and methods. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

From the foregoing it will be appreciated that, although specific embodiments have been described herein for purposes of illustration, various modifications may be made without deviating from the spirit and scope of the invention. Accordingly, the invention is not limited except as by the appended claims.

These and other changes can be made to the present systems and methods in light of the above-detailed description. In general, in the following claims, the terms used should not be construed to limit the specific embodiments disclosed in the specification and the claims, but should be construed to include all systems and methods that read in accordance with the claims. Accordingly, the embodiments are not limited by the disclosure, but instead its scope is to be determined entirely by the following claims.

The invention claimed is:

1. A method for determining a pose of an object of interest at a run time, the method comprising:
   capturing a first image of a first structured light pattern projected onto a first local surface of the object of interest, the first structured light pattern including a plurality of lines of structured light;
   wherein the first local surface is a portion of a surface on the object of interest characterized by the absence of a discernible feature that, when captured in the first image, would otherwise provide sufficient information to determine a complete pose of the object of interest; determining a first run-time data set from the captured first image, wherein the first run-time data set corresponds to information determined from the first structured light pattern projected onto the first local surface and corresponds to surface contours of the first local surface determined from the plurality of lines of structured light of the first structured light pattern;
   comparing the determined first run-time data set and a corresponding first reference data set, the first reference data set corresponding to an ideal pose of the first local surface on an ideally posed reference object; and
   determining at least one first degree of constraint that defines a first partial pose of the first local surface, the at least one first degree of constraint based upon the comparison of the first run-time data set with the corresponding first reference data set.

2. The method of claim 1, further comprising:
   capturing a second image of a second structured light pattern projected onto a second local surface of the object of interest;
   determining a second run-time data set from the captured second image, wherein the second run-time data set corresponds to information determined from the second structured light pattern projected onto the second local surface;
   comparing the determined second run-time data set and a corresponding second reference data set, the second reference data set corresponding to the ideal pose of the second local surface on the ideally posed reference object; and
   determining at least one second degree of constraint that defines a second partial pose of the second local surface, the at least one second degree of constraint based upon the comparison of the second run-time data set and the corresponding second reference data set.

3. The method of claim 2, further comprising:
   determining the pose of the object of interest based upon the at least one first degree of constraint that defines the first partial pose of the first local surface and the at least one second degree of constraint that defines the second partial pose of the second local surface.

4. The method of claim 2, further comprising:
   combining the at least one first degree of constraint that defines the first partial pose of the first local surface with the at least one second degree of constraint that defines the second partial pose of the second local surface; and
   determining the pose of the object of interest based upon the combined at least one first degree of constraint and the at least one second degree of constraint.

5. The method of claim 2 wherein comparing the determined first run-time data set and the corresponding first reference data set, determining the at least one first degree of constraint, comparing the determined second run-time data set and the corresponding second reference data set, and determining the at least one second degree of constraint is replaced by the method comprising:
   combining the first run-time data set with the second run-time data set to determine a global data set;
   comparing the global data set and a corresponding reference global data set, the reference global data set data set corresponding to the ideal pose of at least the first local surface and the second local surface on the ideally posed reference object; and
   determining a plurality of degrees of constraint that define at least partial pose of the first local surface and the second local surface.

6. The method of claim 5, further comprising:
   determining the pose of the object of interest based upon the determined plurality of degrees of constraint.

7. The method of claim 2, further comprising:
   moving an image capture device after capturing the first image so that the second image is captured with a different orientation.

8. The method of claim 1, further comprising:
   determining a transformation that defines a spatial relationship between the first run-time data set and the corresponding first reference data set.

9. The method of claim 1, further comprising:
   projecting the first structured light pattern onto the first local surface of the object of interest.

10. The method of claim 9 wherein projecting the first structured light pattern comprises:
    projecting a first structured laser light pattern.

11. The method of claim 9 wherein projecting the first structured light pattern comprises:
projecting a first moiré fringe pattern.

12. The method of claim 1, further comprising:
capturing a second image of the first structured light pattern projected onto the first local surface of the object of interest; and
determining a second run-time data set from the captured second image, wherein the second run-time data set corresponds to information determined from the first structured light pattern projected onto the first local surface.

13. The method of claim 12, further comprising:
comparing the determined first run-time data set and the second run-time data set to determine an aggregate run-time data set;
comparing the determined aggregate run-time data set and a corresponding reference data set, the reference data set corresponding to an ideal pose of the first local surface on an ideally posed reference object; and
determining at least one first degree of constraint that defines a first partial pose of the first local surface, the at least one first degree of constraint based upon the comparison of the aggregate run-time data set with the corresponding first reference data set.

14. A method for determining a pose of an object of interest at a run time, the method comprising:
capturing a first image of a first structured light pattern projected onto a first local surface of the object of interest;
determining a first run-time data set from the captured first image, wherein the first run-time data set corresponds to information determined from the first structured light pattern projected onto the first local surface;
comparing the determined first run-time data set and a corresponding first reference data set, the first reference data set corresponding to an ideal pose of the first local surface on an ideally posed reference object;
determining at least one first degree of constraint that defines a first partial pose of the first local surface, the at least one first degree of constraint based upon the comparison of the first run-time data set with the corresponding first reference data set;
comparing the determined first run-time data set and the second run-time data set to determine an aggregate run-time data set;
comparing the determined aggregate run-time data set and a corresponding reference data set, the reference data set corresponding to an ideal pose of the first local surface on an ideally posed reference object;
determining at least one first degree of constraint that defines a first partial pose of the first local surface, the at least one first degree of constraint based upon the comparison of the aggregate run-time data set with the corresponding first reference data set
comparing the determined second run-time data set and a corresponding reference data set, the reference data set corresponding to an ideal pose of the first local surface on an ideally posed reference object;
determining at least one second degree of constraint that defines the first partial pose of the first local surface, the at least one second degree of constraint based upon the comparison of the second run-time data set with the corresponding first reference data set;
comparing the determined first degree of constraint and the second degree of constraint to determine an aggregate degree of constraint; and
determining at least partial pose of the first local surface based upon the comparison of the a first degree of constraint and the second degree of constraint.

15. The method of claim 1, further comprising:
determining a second degree of constraint that further defines the first partial pose of the first local surface, the at least one second degree of constraint based upon the comparison of the first run-time data set with the corresponding first reference data set.

16. The method of claim 9 wherein projecting the first structured light pattern comprises:
projecting the first structured light pattern using an optical element operable to project the first structured light pattern at an orientation of interest onto the first local surface.

17. A system that determines a pose of an object of interest at a run time, comprising:
an image capture system operable to capture a first image of a first structured light pattern projected onto a first local surface of the object of interest and operable to capture a second image of a second structured light pattern projected onto a second local surface of the object of interest, wherein the first structured light pattern includes a first plurality of lines of structured light and wherein the second structured light pattern includes a second plurality of lines of structured light;
a structured light source system operable to project the first structured light pattern onto the first local surface and operable to project the second structured light pattern onto the second local surface; and
a processor communicatively coupled to the image capture system and the structured light source system, and operable to:
determine a first run-time data set from the captured first image, wherein the first run-time data set corresponds to information determined from the first structured light pattern projected onto the first local surface and corresponds to surface contours of the first local surface determined from the first plurality of lines of structured light of the first structured light pattern;
determine a second run-time data set from the captured second image, wherein the second run-time data set corresponds to information determined from the second structured light pattern projected onto the second local surface and corresponds to surface contours of the second local surface determined from the second plurality of lines of structured light of the second structured light pattern;
compare the determined first run-time data set and a corresponding first reference data set, the first reference data set corresponding to an ideal pose of the first local surface on an ideally posed reference object, to determine at least a first degree of constraint corresponding to the pose of the first local surface; and
compare the determined second run-time data set and a corresponding second reference data set, the second reference data set corresponding to the ideal pose of the second local surface on the ideally posed reference object, to determine at least a second degree of constraint corresponding to the pose of the second local surface.

18. The system of claim 17, wherein the image capture system comprises:
a robot device operable to maneuver at least one robot device member through a workspace;
a single image capture device coupled to the at least one robot device member such that the robot device moves the single image capture device to a first position and a first orientation so that the single image capture device captures the first image, and such that the robot device moves the single image capture device to a second position and a second orientation so that the single image capture device captures the second image.

19. The system of claim 17, wherein the single image capture system comprises:
   a first image capture device at a first position and a first orientation so that the first image capture device captures the first image; and
   a second image capture device at a second position and a second orientation so that the second image capture device captures the second image.

20. The system of claim 17, wherein the structured light source system comprises:
   a robot device operable to maneuver at least one robot device member through a workspace;
   a single structured light source coupled to the at least one robot device member such that the robot device moves the structured light source system to a first position and a first orientation so that the structured light source system projects the first structured light pattern onto the first local surface, and such that the robot device moves the structured light source system to a second position and a second orientation so that the structured light source system projects the second structured light pattern onto the second local surface.

21. The system of claim 17, wherein the structured light source system comprises:
   a first structured light source at a first position and a first orientation so that the first structured light source projects the first structured light pattern onto the first local surface; and
   a second structured light source at a second position and a second orientation so that the second structured light source projects the second structured light pattern onto the second local surface.

22. The system of claim 17, wherein the structured light source system comprises:
   a laser light source, such that the laser light source at least projects a first structured laser light pattern onto the first local surface.

23. A method for determining a pose of an object of interest, the method comprising:
   capturing at least one reference image of each of a plurality of reference local surfaces on a reference object oriented in a reference pose, wherein each of the plurality of reference local surfaces of the reference object has a structured light pattern projected thereon, the structured light pattern including a plurality of lines of structured light;
   determining a plurality of reference data sets, wherein one reference data set is determined for each one of the plurality of reference local surfaces, and wherein the plurality of reference data sets corresponds to information determined from the structured light pattern projected onto its respective reference local surface and corresponds to surface contours of the respective local surface determined from the plurality of lines of structured light; and
   capturing at least one image of each of a plurality of local surfaces on the object of interest in an unknown pose at a run time, wherein each of the local surfaces of the object of interest in the unknown pose has the structured light pattern projected thereon, and wherein each one of the local surfaces of the object of interest in the unknown pose correspond to one of the reference local surfaces;
   determining a plurality of run-time data sets, wherein one run-time data set is determined for each one of the plurality of local surfaces, and wherein the run-time data sets correspond to information determined from the structured light pattern projected onto its respective local surface; and
   comparing the determined run-time data sets and the corresponding reference data sets.

24. The method of claim 23, further comprising:
   determining at least one reference degree of constraint from each of the plurality of reference data sets; and
   determining a partial reference pose for each of the reference local surfaces based upon the determined at least one reference degree of constraint.

25. A method for determining a pose of an object of interest, the method comprising:
   capturing at least one reference image of each of a plurality of reference local surfaces on a reference object oriented in a reference pose, wherein each of the plurality of reference local surfaces of the reference object has a structured light pattern projected thereon;
   determining a plurality of reference data sets, wherein one reference data set is determined for each one of the plurality of reference local surfaces, and wherein the plurality of reference data sets corresponds to information determined from the structured light pattern projected onto its respective reference local surface;
   capturing at least one image of each of a plurality of local surfaces on the object of interest in an unknown pose at a run time, wherein each of the local surfaces of the object of interest in the unknown pose has the structured light pattern projected thereon, and wherein each one of the local surfaces of the object of interest in the unknown pose correspond to one of the reference local surfaces;
   determining a plurality of run-time data sets, wherein one run-time data set is determined for each one of the plurality of local surfaces, and wherein the run-time data sets correspond to information determined from the structured light pattern projected onto the respective local surface;
   comparing the determined run-time data sets and the corresponding reference data sets;
   determining at least one reference degree of constraint from each of the reference data sets; and
   determining at least one run-time degree of constraint from each of the run-time data sets,
   wherein comparing the run-time data sets and the reference data sets comprises:
   comparing the determined at least one run-time degree of constraint and the determined respective reference degree of constraint; and
   determining the pose of the object of interest in the unknown pose based upon the comparison of the determined at least one run-time degree of constraint and the determined respective reference degree of constraint.

26. The method of claim 25, further comprising:
   determining a reference partial pose for each of the reference local surfaces based upon the determined at least one reference degree of constraint; and
   determining a run-time partial pose for each of the local surfaces based upon the determined at least one run-time degree of constraint,
   wherein comparing the run-time data sets with the reference data sets comprises:

comparing the determined run-time partial pose and the determined respective reference partial pose; and determining the pose of the object of interest in the unknown pose based upon the comparison of the determined run-time partial pose with the determined respective reference partial pose.

27. A system that determines a pose of an object of interest at a run time, comprising:

means for capturing at least one image of each of a plurality of local surfaces on the object of interest in an unknown pose at the run time, wherein each of the local surfaces of the object of interest in the unknown pose has a structured light pattern projected thereon, wherein each structured light pattern includes a plurality of lines of structured light and wherein each one of the local surfaces of the object of interest in the unknown pose corresponds to one of a plurality of reference local surfaces;

means for determining a plurality of run-time data sets, each data set including a plurality of points, wherein one run-time data set is determined for each one of the plurality of local surfaces, and wherein the plurality of run-time data sets corresponds to information determined from the structured light pattern projected onto its respective local surface and corresponds to surface contours of the respective local surface determined from the plurality of lines of structured light; and means for comparing the determined run-time data sets and a plurality of corresponding reference data sets means for capturing at least one reference image from a fixed location with respect to each of a plurality of reference local surfaces on a reference object oriented in a reference pose, wherein each of the plurality of reference local surfaces of the reference object has a structured light pattern projected thereon; and means for determining the plurality of reference data sets, wherein one reference data set is determined for each one of the plurality of reference local surfaces, and wherein the plurality of reference data sets corresponds to information determined from the structured light pattern projected onto its respective reference local surface.

* * * * *